United States Patent [19]

Derrenge et al.

[11] Patent Number: 5,131,010
[45] Date of Patent: Jul. 14, 1992

[54] VOICE GUARD DIGITAL VOTER FOR MULTIPLE SITE PST RF TRUNKING SYSTEM

[75] Inventors: Charles L. Derrenge, Lynchburg; Marcella M. Tucker, Amherst, both of Va.

[73] Assignee: General Electric Company, Lynchburg, Va.

[21] Appl. No.: 420,244

[22] Filed: Oct. 12, 1989

[51] Int. Cl.[5] .......................... H04B 7/10; H04L 1/02
[52] U.S. Cl. ..................................... 375/100; 455/133; 455/5.4
[58] Field of Search .......................... 375/100, 101, 40; 455/32-34, 53-56, 132, 133; 340/825.5; 371/47.1, 5.4, 5.5, 36, 67.1

[56] References Cited

U.S. PATENT DOCUMENTS

| | | | |
|---|---|---|---|
| 3,701,109 | 10/1972 | Peters | 364/200 |
| 4,013,962 | 3/1977 | Beseke et al. | 455/135 |
| 4,128,809 | 12/1978 | Kage | 371/69.1 |
| 4,232,294 | 11/1980 | Burke et al. | 364/200 X |
| 4,317,218 | 2/1982 | Perry | 455/54 |
| 4,395,710 | 7/1983 | Einolf, Jr. et al. | 340/825.5 |
| 4,530,087 | 7/1985 | Yamamoto | 375/100 X |
| 4,583,089 | 4/1986 | Cope | 340/825.5 X |
| 4,593,282 | 6/1986 | Acampora et al. | 340/825.5 |
| 4,623,886 | 11/1986 | Livingston | 340/825.5 |
| 4,638,311 | 1/1987 | Gerety | 340/825.5 |
| 4,642,630 | 2/1987 | Beckner et al. | 340/825.5 |
| 4,644,348 | 2/1987 | Gerety | 340/825.5 X |
| 4,652,873 | 3/1987 | Dolsen et al. | 340/825.5 |
| 4,677,612 | 6/1987 | Olson et al. | 340/825.5 X |
| 4,682,324 | 7/1987 | Ulug | 340/825.5 X |
| 4,707,693 | 11/1987 | Hessel | 340/825.5 X |
| 4,905,302 | 2/1990 | Childress et al. | 455/32 X |

Primary Examiner—Benedict V. Safourek
Assistant Examiner—Tesfaldet Bocure
Attorney, Agent, or Firm—Nixon & Vanderhye

[57] ABSTRACT

A Voice Guard digital voter system for a multi-site public service trunking (PST) digitally trunked RF communications system operates on the principle that it is highly likely that messages received during a system redundancy removal period are redundant messages. For a given RF channel, digital receiver is associated with each of multiple sites and receives digital messages reported to it by its associated sites. The multiple digital receivers are connected to a digital selector via a service request line (FSL) and a serial data line (BSL). Digital receivers calculate a bit error rate code (BERC) for each message they receive. All digital receivers receiving a version of a message are synchronized by the digital selector in response to a request to transmit by one of the digital receivers. The digital receivers wait a delay time corresponding to the BERC they calculates and also responsive to a fixed slot assignment associated with each digital receiver. The digital receiver having the lowest calculated BERC begins first to transmit its message to the selector—and all other receivers abort transmitting. Bus contentions between digital receivers calculating the same BERC by introducing the additional delay time corresponding to digital receiver fixed slot assignment.

14 Claims, 13 Drawing Sheets

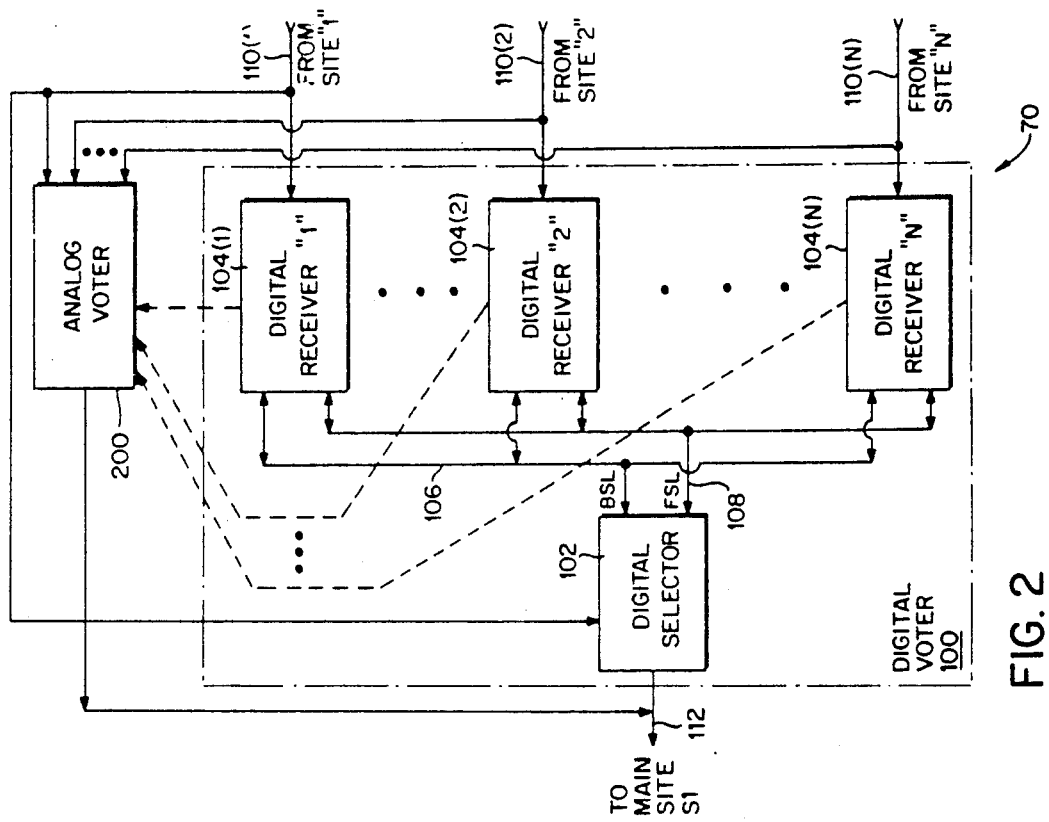
FIG. 2
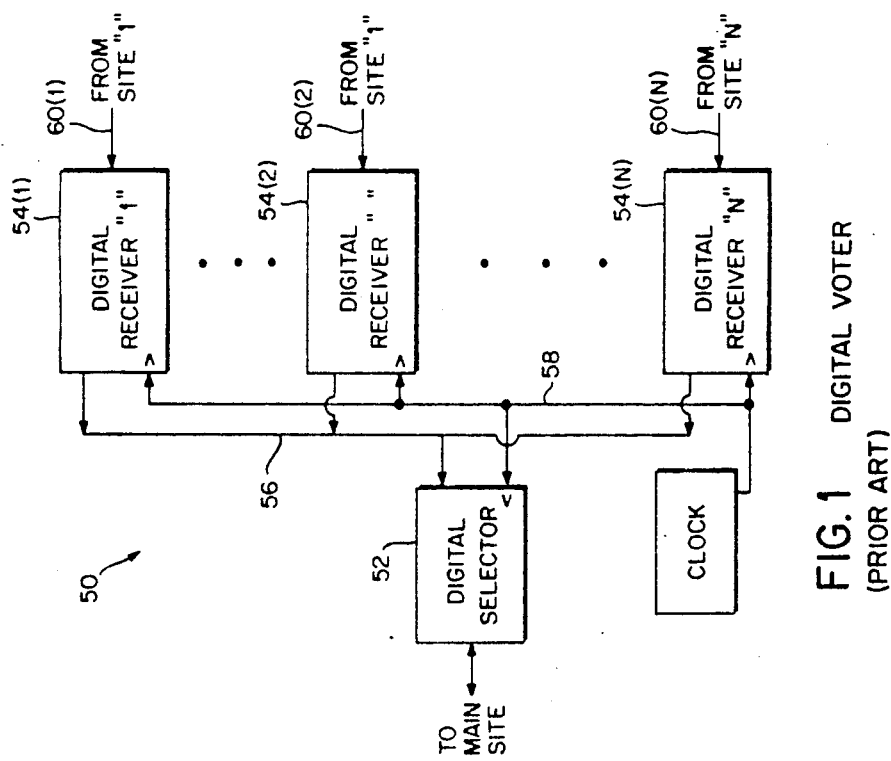
FIG. 1 DIGITAL VOTER (PRIOR ART)

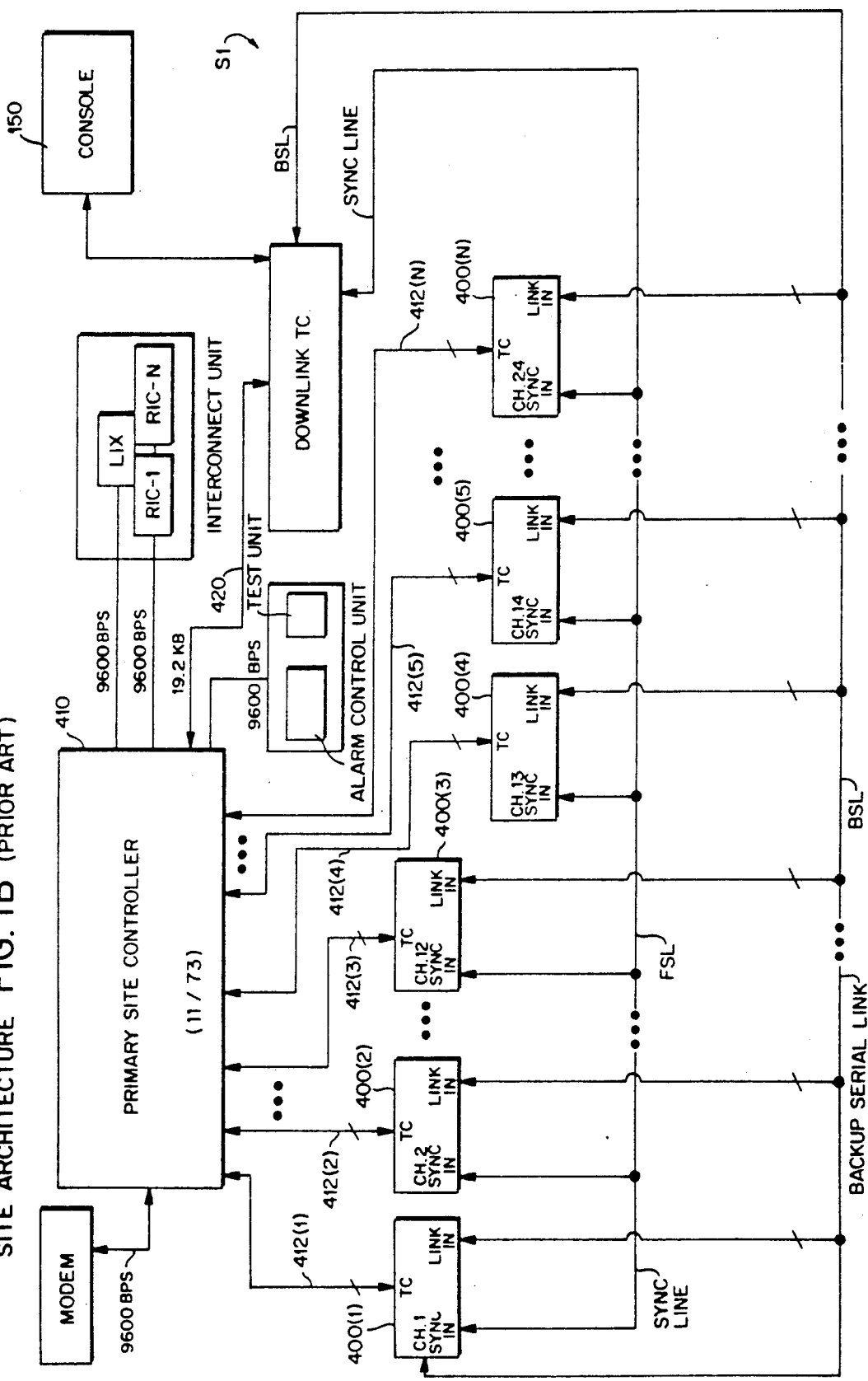
SITE ARCHITECTURE FIG. 1B (PRIOR ART)

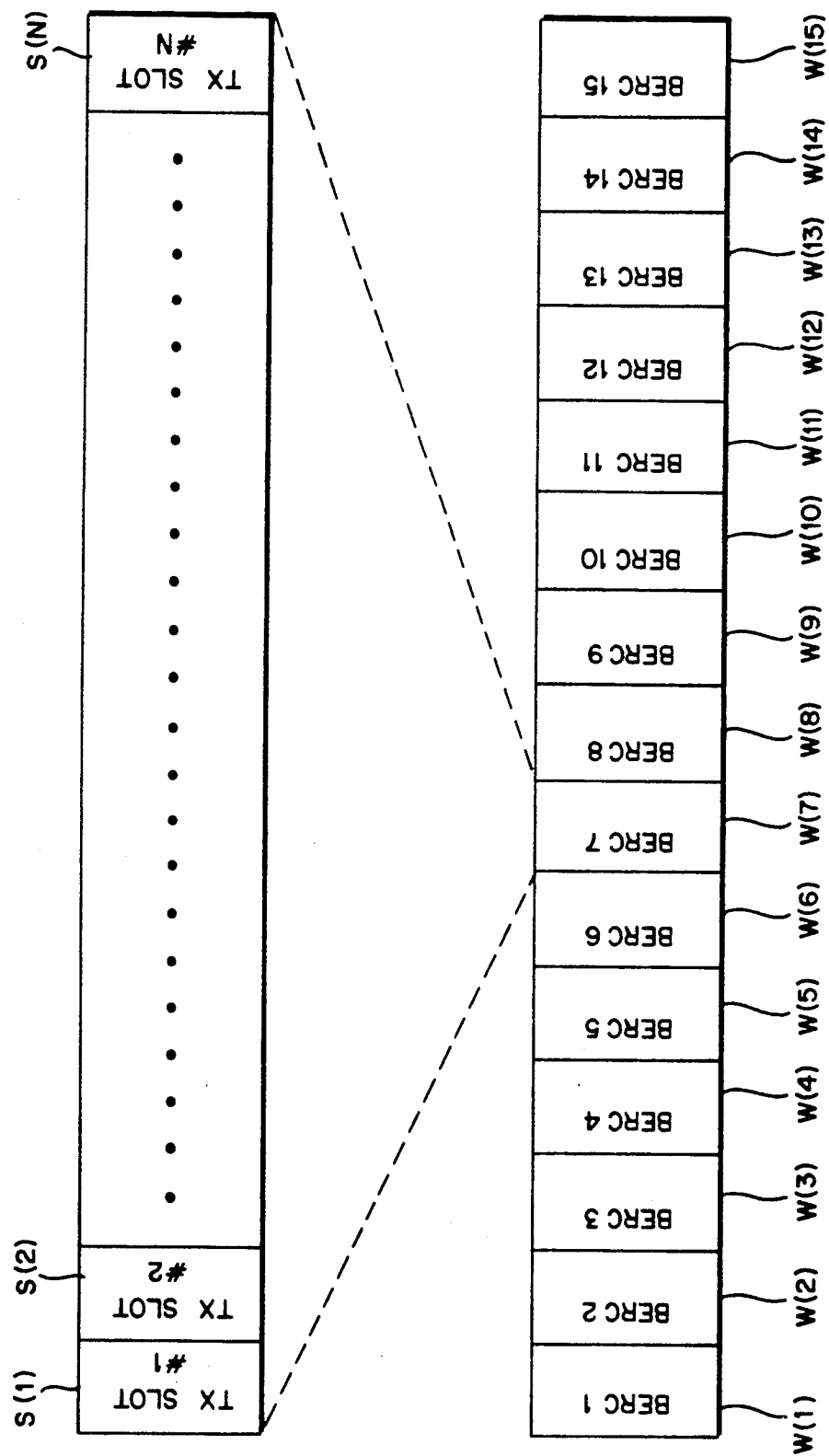

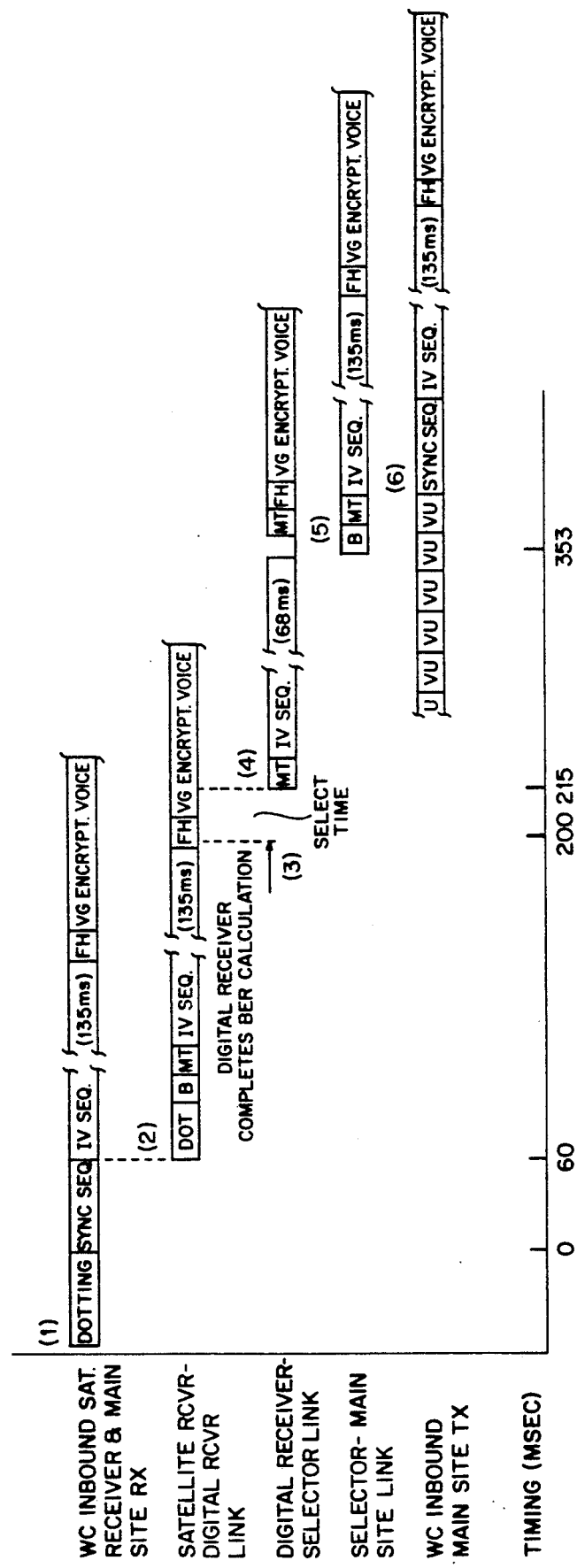
FIG. 4 VG VOTER TIMING

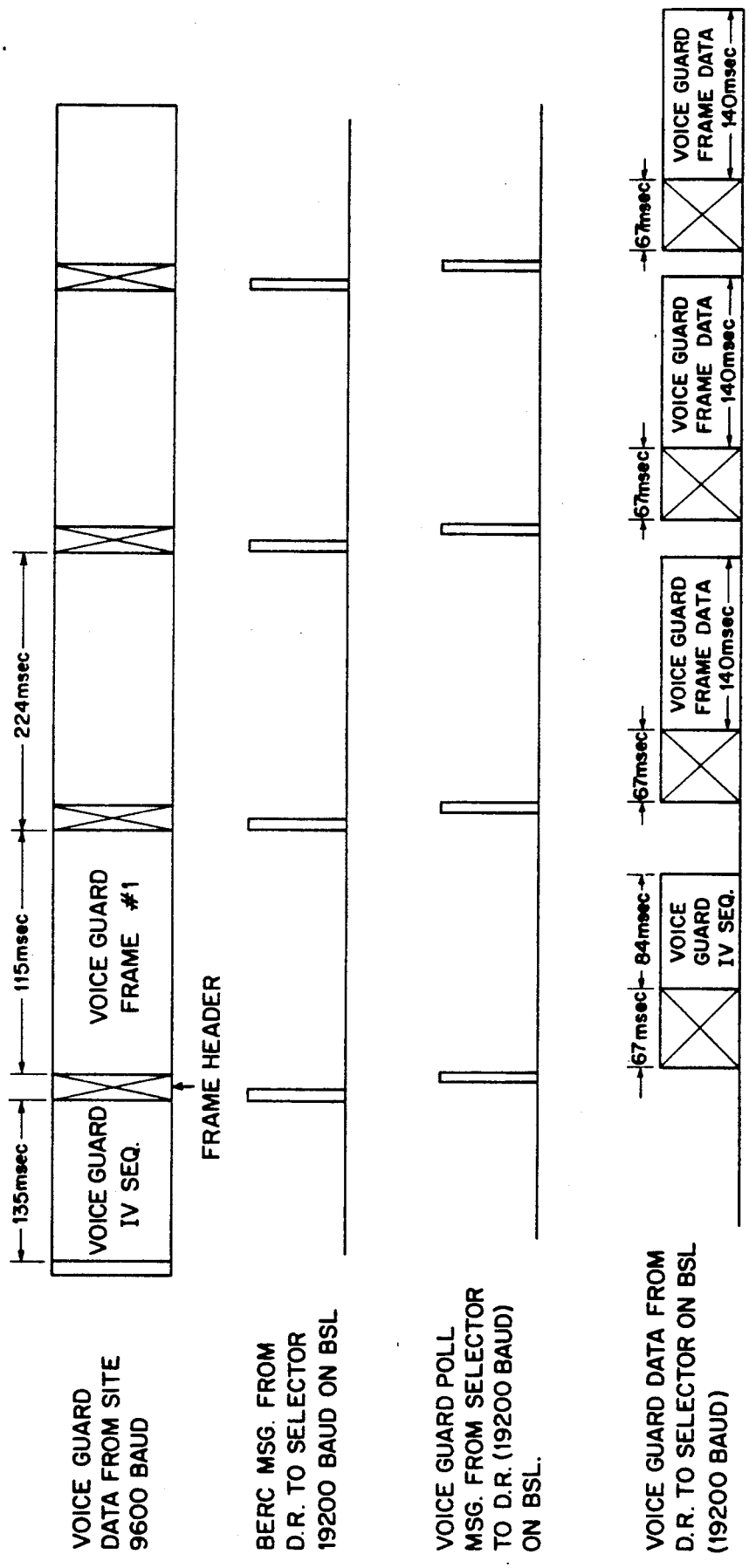

(DIGITAL RECEIVER)

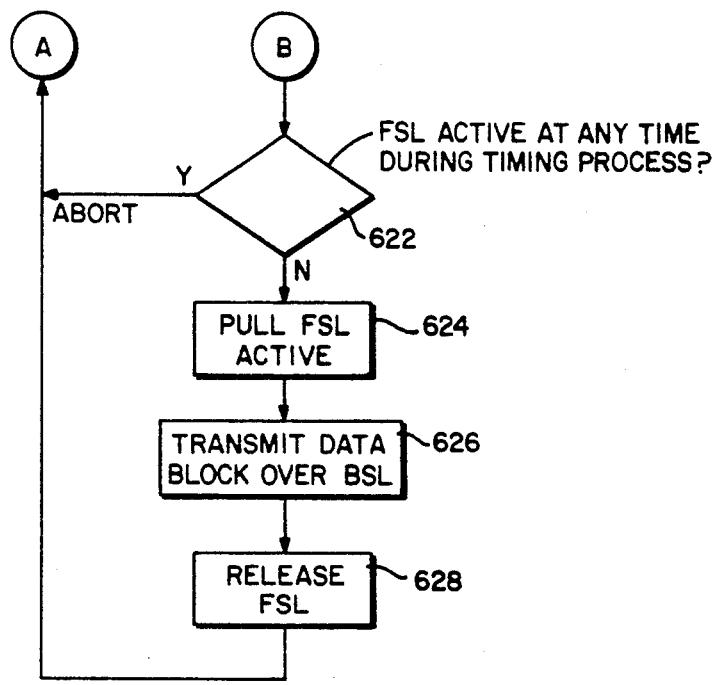
FIG. 6B (DIGITAL RECEIVER)
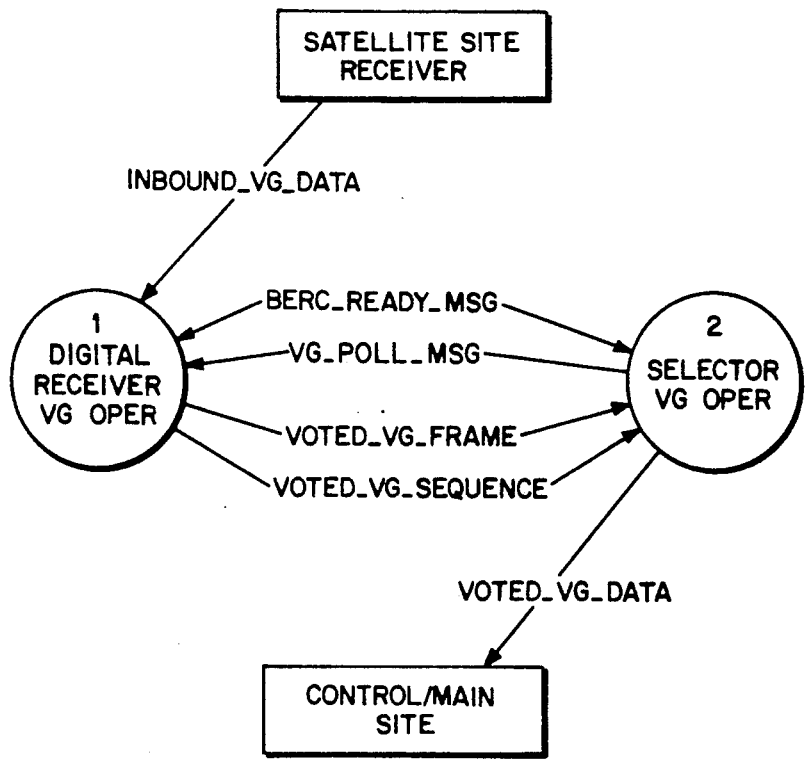
FIG. 7   LEVEL 0. VOTER VOICEGUARD OPERATION

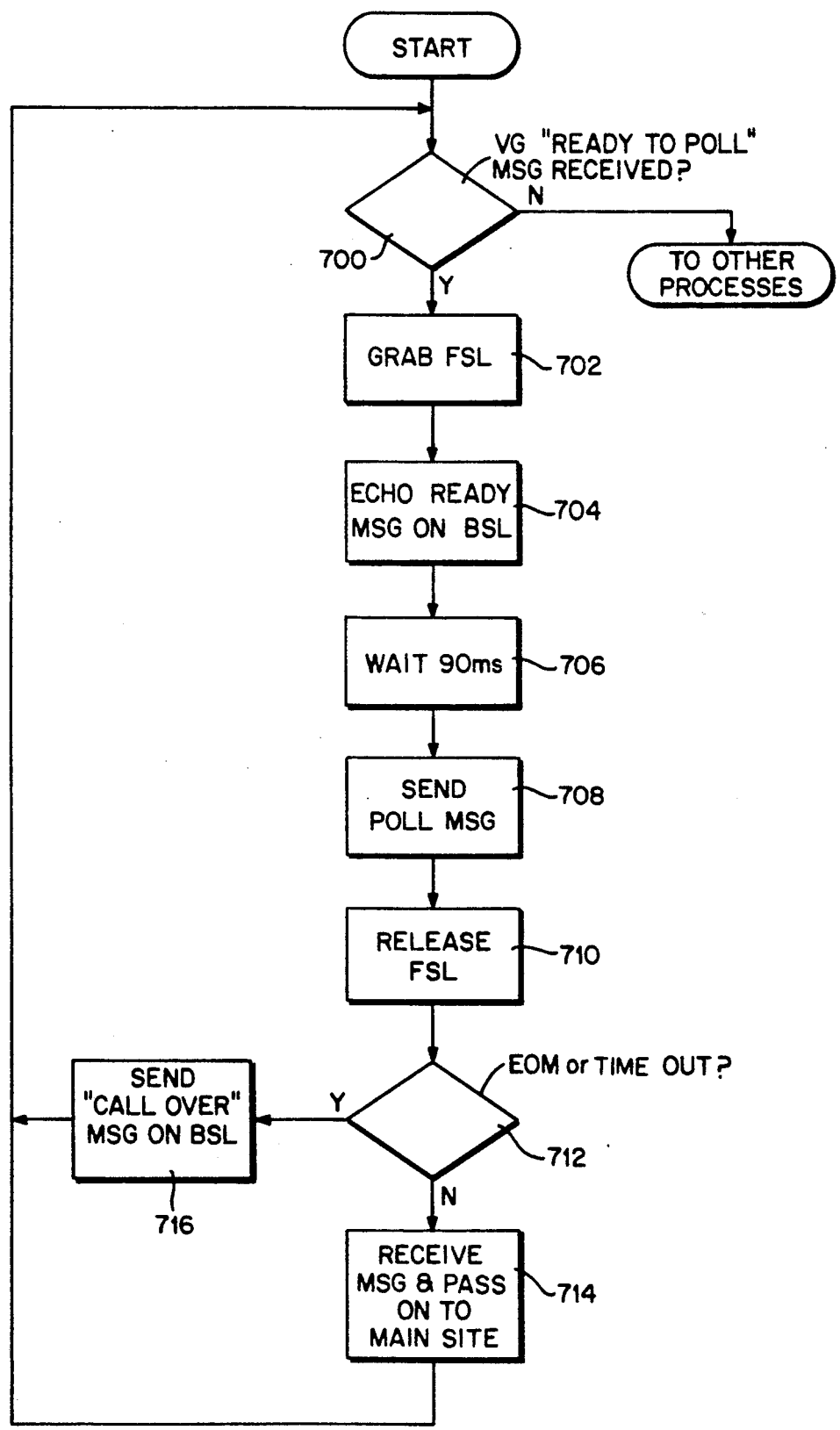
FIG. 6C (DIGITAL SELECTOR)

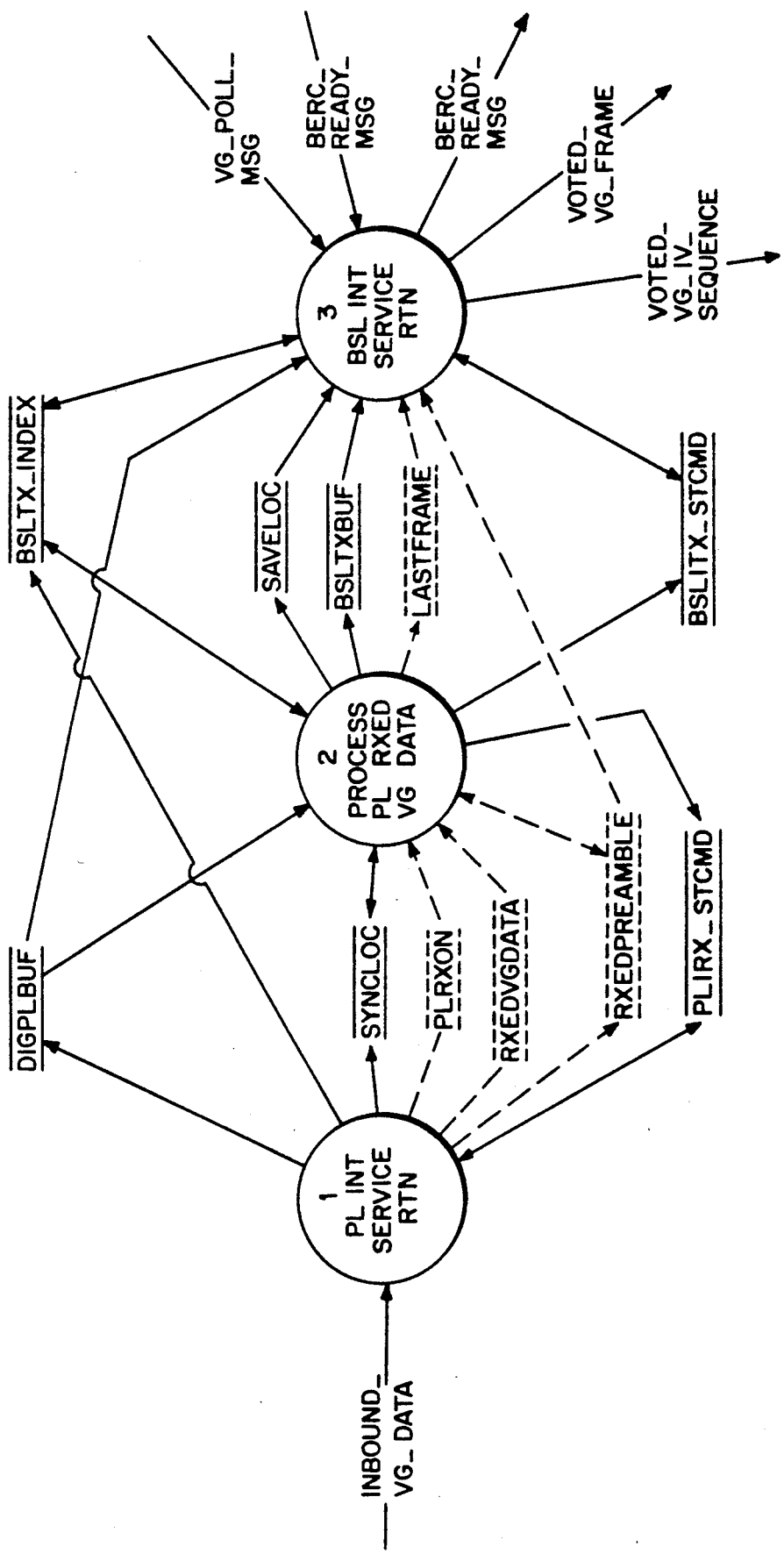
FIG. 8   LEVEL 1: DIGITAL RECEIVER VG OPERATION

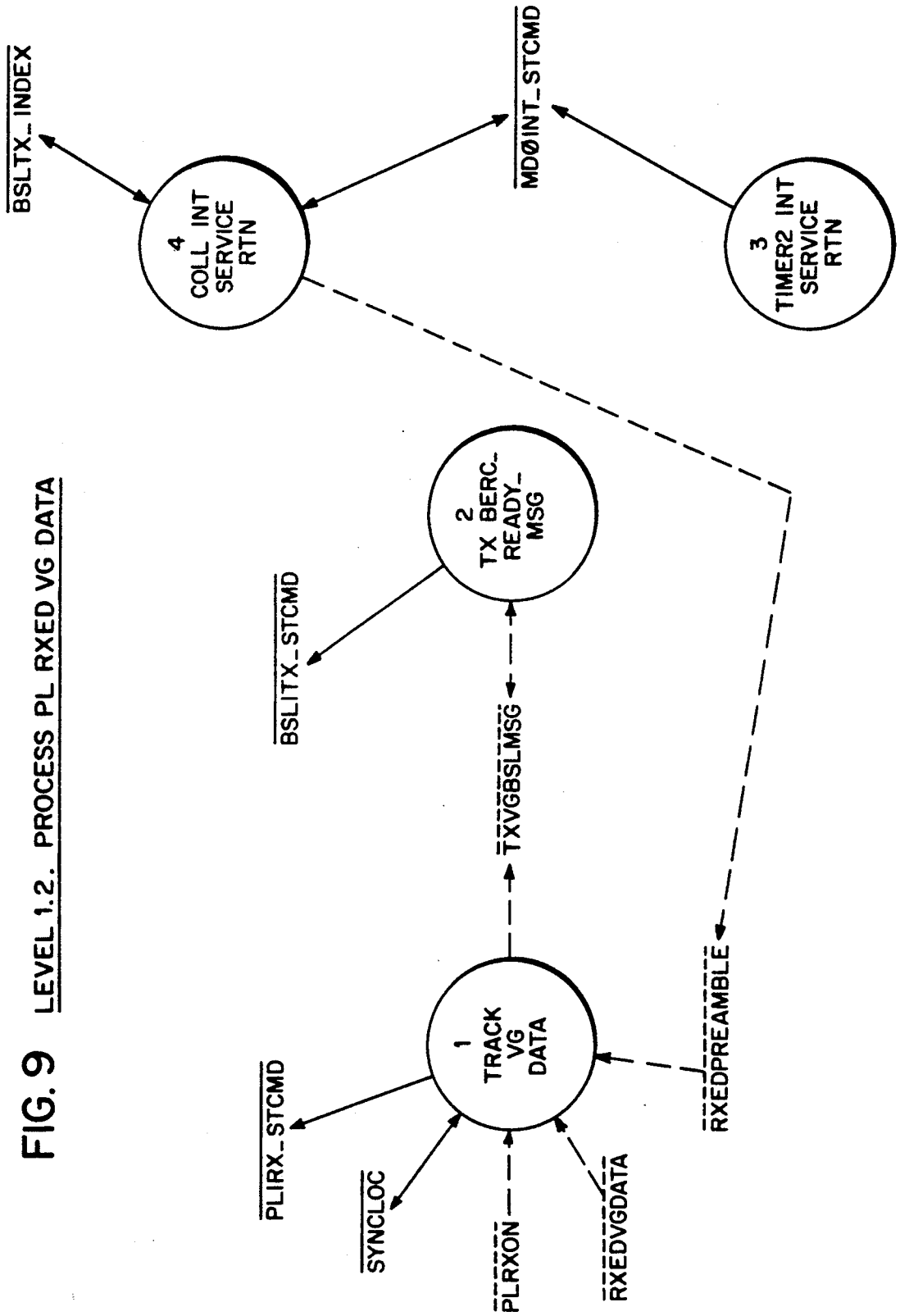
FIG. 9  LEVEL 1.2. PROCESS PL RXED VG DATA

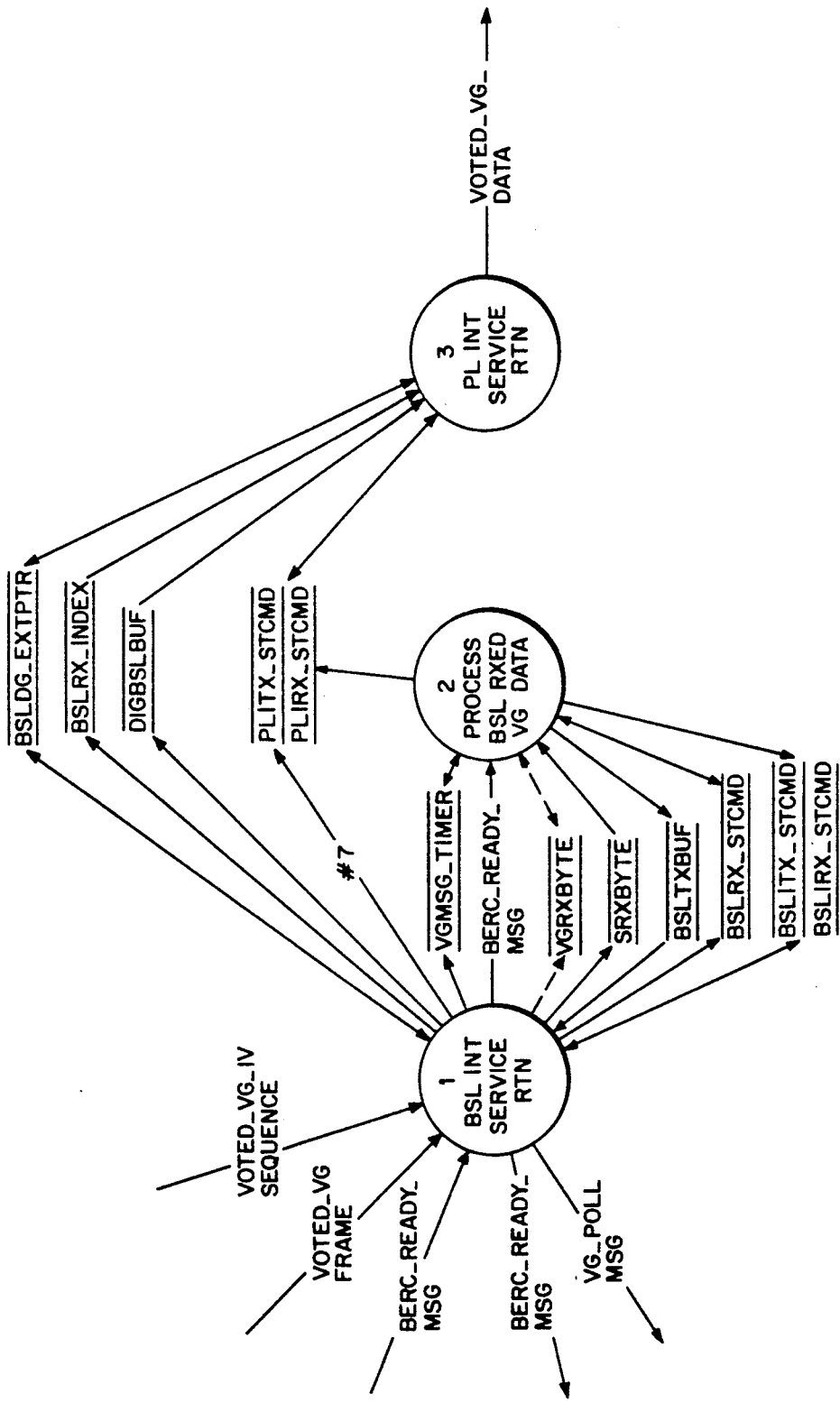
FIG. 10  LEVEL 2. SELECTOR VG OPERATION

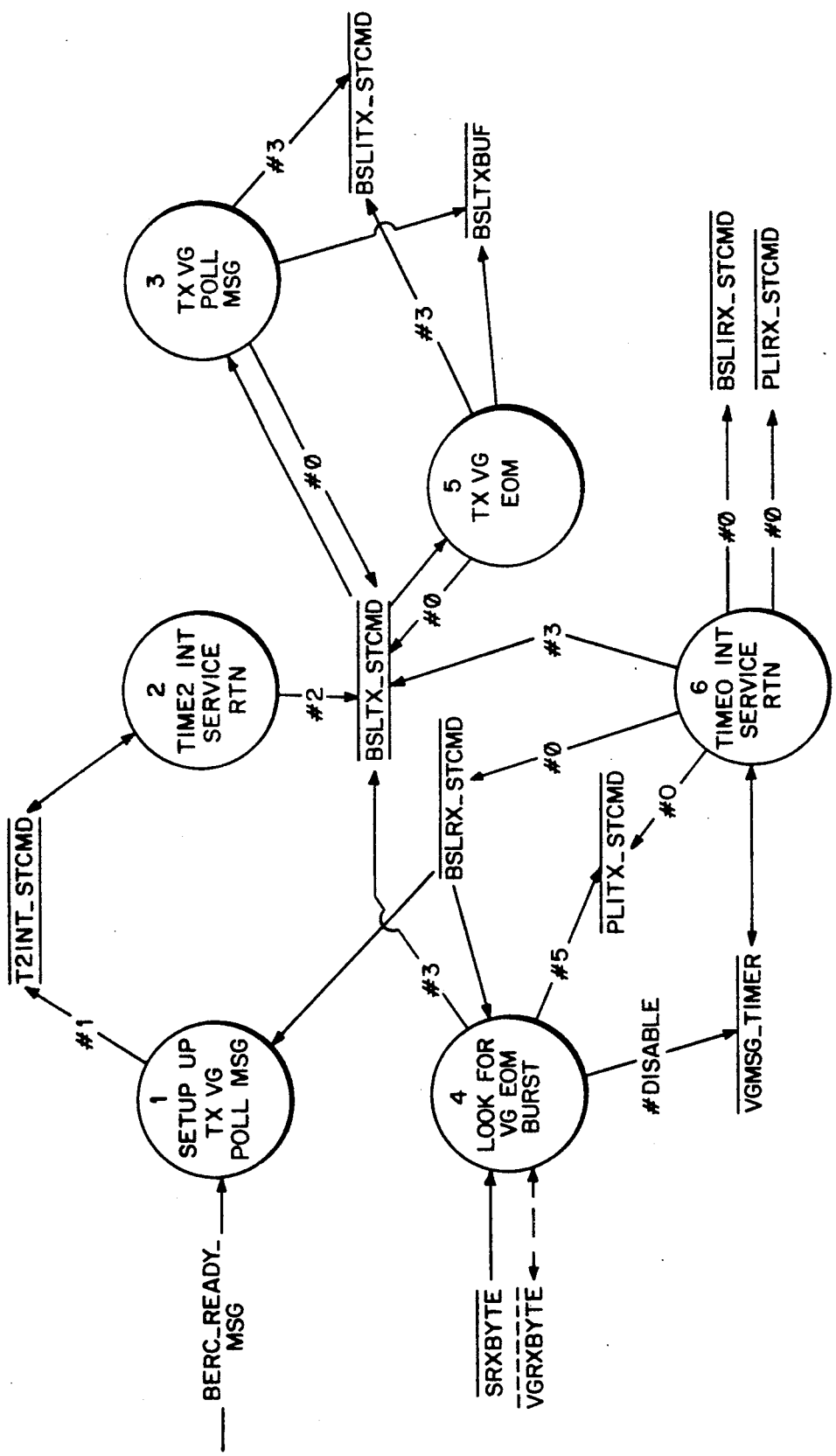
FIG.11   LEVEL 2.2. PROCESS BSL RXED VG DATA

VOICE GUARD DIGITAL VOTER FOR MULTIPLE SITE PST RF TRUNKING SYSTEM

CROSS-REFERENCES TO RELATED APPLICATION

This application is related to commonly-assigned copending application Ser. No. 07/364,907 filed on Jun. 12, 1989 now abandoned in the name of Brown et al entitled "DIGITAL VOTER FOR MULTI-SITE PST RF TRUNKING SYSTEM". The entire disclosure of that copending application is hereby incorporated by reference herein as if expressly set forth.

FIELD OF THE INVENTION

The present invention relates to digital trunked radio communications systems, and more specifically to such communications systems including multiple receiving sites. Still more particularly, the invention relates to an arrangement for receiving several identical incoming digitally-encoded RF messages from different radio receiver sites, for "voting" on (and thereby selecting) one of those several messages, and for passing the selected message on to a main site.

BACKGROUND AND SUMMARY OF THE INVENTION

Modern trunked radio communications systems typically include geographically distributed "satellite" receiving sites in addition to one or more main transmitting site. Consider a simple system including only one main transmitting/repeater site. The main transmitting/repeater site is typically located at a relatively high elevation (e.g., on the top of a hill, mountain or tall building) and generally is provided with relatively high powered RF transmitters to permit the site to "cover" a large desired geographical service area. The main site transmitter output power and other factors contributing to the "effective radiated power" (ERP) are selected so that signals transmitted by the main site can be received at acceptable signal strength throughout the desired service area.

Unfortunately, most or all of the mobile and portable RF transceivers served by the main site cannot provide the same high effective radiated power as is provided by the main site because of several limiting factors.

While the main site transmitter power output can be in the range of several hundreds or thousands of watts RF, a mobile transceiver may be capable of providing only 5 to 25 watts of RF at its output and portable (e.g., hand held) transceivers may be capable of generating even less power (e.g., on the order of 1 watt or even less). Size and cost limitations to a large degree dictate the limited RF power outputs of mobile and portable units, but power source limitations are perhaps the most critical factor. A portable transceiver using a few small nickel-cadmium battery cells as its power source can provide only low power output levels. Mobile transceivers can obtain additional power from a vehicle electrical system, but even this power source imposes serious constraints on the maximum power supply current the transceiver can draw.

Since the various mobile and portable transceivers within a radio communications system have vastly lower effective radiated power outputs than do the transmitters at the main site, all mobile/portable transceivers within the service area can typically receive the strong transmissions from the main site but the receivers located at the main site may not receive the weaker transmissions from the mobile and portable transceivers (or may receive the transmissions at signal strengths which are too low to provide useful, reliable communications). In other words, the "talk in" range of the main site is typically less than its "talk out" range.

As is well known, multiple receiving sites have been employed in the past to help solve this problem. Typically, so-called "satellite" receiving sites are provided at various geographical locations within the service area. The main site is provided with a full complement of receivers, and similar receivers are provided at each satellite receiving site. When a mobile or portable receiver transmits within the service area, some or all of the satellite receiving sites and the main site may receive the transmission. Depending upon where in the service area the transmitting mobile/portable happens to be at the time it transmits, some sites will receive the transmission at high signal strength levels, other sites will receive the transmission at lower levels, and some sites may not receive the transmission at all, for example, if an obstruction or very long signal path exists between the mobile/portable and the site.

When digital RF communications are involved, it is desirable to select only the "best" version of the received message and to discard or ignore redundant versions of the received message (this process can be called "redundancy removal"). The main site need only process a single version of the message—and to reduce error it should process the "best" version of that message (e.g., the version with the least "bit error rate" or other similar standard relating to the correctness of digital message reception. As the various receiving sites receive a given mobile/portable transmission at different average signal strengths and under different noise and other conditions, it may, for example, be desirable in some systems to select the version of the transmission received with the best quality (e.g., highest average signal strength or lowest bit error rate) since that version is most likely to have carried the communicated information reliably and correctly (noise, fading and other effects can degrade reception of weak signals).

In many prior art systems, all sites which receive the transmission generate an indication of the quality of the received signal (e.g., based on received signal strength and/or other factors). The overall communication system then typically may "vote" based on the quality indications reported by the different receiving sites to select a single version of the received signal for use. Commonly assigned U.S. Pat. No. 4,317,218 to Perry (1982) describes in detail one example of this type of prior art voting circuit within a repeater station control system. See also, for example, U.S. Pat. No. 4,013,962 to Beseke et al (1977). It is also generally known to calculate the "BER" (bit error rate) of a received digital signal as an indication of the quality and reliability of the received signal.

Things happen very rapidly in state-of-the-art digital trunking systems such as The General Electric Company 16-PLUS Public Service Trunking (PST) digitally trunked radio communications system. The architecture and operation of this system is disclosed in much greater detail in the following co-pending commonly assigned U.S. patent applications (which are incorporated by reference herein):

Ser. No. 07/056,922 Childress et al filed Jun. 3, 1987, issued Feb. 29, 1990 now U.S. Pat. No. 4,905,302

Ser. No. 07/057,046 Childress et al filed Jun. 3, 1987; and

Ser. No. 07/085,572 Nazarenko et al filed Aug. 14, 1987, issued May 30, 1989 now U.S. Pat. No. 4,835,731.

Briefly, GE's PST system communicates digital data at 9600 baud in "slotted" message frames each having a duration of 30 ms. These "slots" are closely (although not exactly) synchronized in time across all channels (for both inbound and outbound communications) and follow the "slot" timing of the digital control channel. Some messages use only a single slot, while other messages occupy two slots.

A mobile transceiver requiring a channel assignment will in GE's preferred system transmit a channel assignment request message in one or more successive predefined time slots on the inbound control channel and then wait for a responsive two-slot channel assignment message to be transmitted by the main site on the outbound control channel. The mobile transceiver expects to receive a response (of some sort) to its request message within a relatively short time period (e.g., so the mobile can rapidly determine if its request was ignored and retransmit the request). In configurations including multiple satellite receiving sites, it is necessary during this short time period for the system to select a single version of the received message and pass it to the main site for processing and response. In a system having a main site and two satellite receiving sites, for example, the following may occur:

(a) the main site receives and decodes the message;

(b) satellite receiving site (1) receives and decodes the message;

(c) satellite receiving site (2) receives and decodes the message;

(d) satellite receiving sites (1) and (2) and the main site communicate the message versions they received (assuming they each received the message) to a centralized voter (e.g., located at the dispatch console);

(e) the voter "votes" on the versions of the messages received by the main and satellite sites to select a single version of the message (and preferably also discards all non-selected versions while somehow ensuring that the messages being discarded are in fact redundant versions of the same message rather than different messages);

(f) the system processes the selected version of the message and generates an appropriate responsive message; and (g) the generated responsive message is transmitted over the main site outbound control channel for reception by the mobile.

The term "system latency" refers to the amount of time it takes for a message to propagate through the system. For example, one measure of system latency is the delay from which a mobile transceiver user keys his microphone (e.g., thereby generating a working channel assignment request) to the time the mobile transceiver receives a responsive message back from the system. Obviously, it is desirable to minimize system latency since rapid access and rapid system response provide great advantages in terms of user friendliness, system throughout, and the like. In the GE PST system, this particular system latency parameter has a maximum of 90–100 milliseconds—and the mobile will automatically retransmit its request if such a time period elapses and no response has yet been received. Thus, it is generally necessary for steps (a)–(g) described above to be performed within 100 ms or less in the GE PST system.

For such minimal system latency to be achieved, each of steps (a)–(g) must be performed as rapidly as possible. The delays introduced by some of the steps cannot be significantly reduced because of practical considerations and the laws of physics (e.g., it takes a certain finite amount of time to receive and decode an RF message being transmitted, it takes a finite amount of time to transmit a received message over a landline from a satellite site to a central location, and it takes a certain finite amount of time to transmit a responsive RF message over the control channel). The time required by step (e) to "vote" on one received message and to discard redundant versions of the same message should therefore be minimized in order to reduce overall system latency.

FIG. 1 is a schematic block diagram of a prior art digital voter architecture 50 used in the past by GE in its Voice Guard Digital Voter (described in greater detail in GE Publication LBI-31600). Voter 50 includes a digital selector 52 and plural digital receivers 54 connected together via a bus 56. In the embodiment shown, digital receiver 54(1) receives messages in digital form from receiver site 1, digital receiver 54(2) receives messages in digital form from receiver site 2, ..., and digital receiver 54(N) receives messages in digital form from receiver site N. Each receiver 54 stores the messages it receives in a temporary buffer for selection by digital selector 52.

Digital selector 52 must determine which of digital receivers 54 have stored received messages and select one of multiple redundant messages if more than one digital receiver has stored the same received message. In the past, these steps were performed by a polling process over the bus 56. Specifically, digital selector 52 (or some other "bus controller" component) would periodically and successively send a signal over bus 56 (which could be a conventional serial or parallel data bus) to each of the digital receivers 54 in turn. This signal in effect "asked" each of the digital receivers 54, one at a time, whether they had received a message. If one or more of polled digital receivers 54 responded that it had received a digitized speech message, those receivers would typically send an indication of the quality of the signal they had received (e.g., the bit error rate of the received signal) to the digital selector 52 (e.g., either directly in response to the initial poll, or in a further communication subsequent to the initial poll). Digital selector 52 would grant the digital receiver which received the message with the lowest BER permission to transmit its received message to it over the bus 56. Contentions for bus 56 were avoided because the only time a digital receiver 54 could transmit on the bus was when it was granted permission to do so by digital selector 52—and the digital selector would only grant such permission to one digital receiver 54 at a time.

A significant problem with the polling approach is that it introduces too much delay for PST and therefore unacceptably increases system latency. Each digital receiver 54 must be polled individually, and each poll takes a certain amount of time T. If N is large (i.e., there are a large number of satellite sites), the process of polling all digital receivers will take (T*N) seconds. In the worst case where a satellite site n is the only site to receive a particular RF message (from say a portable transceiver) and at the time this received message is communicated to corresponding digital receiver 54(n)

the digital selector 52 has just finished polling digital receiver 54(n) and is about to poll digital receiver 54(n+1) (assuming a polling sequence in ascending order of 1−N), it will take the full (T*N) seconds before digital selector 52 again polls digital receiver 54(n) to determine that a message has been received. Additional time will then be required to notify digital receiver 54(n) that it has been granted permission to transmit over bus 56, and still additional time is required to actually transfer the message from digital receiver 54(n) to digital selector 52.

An alternate technique used in the past to communicate messages from the digital receivers 54 to digital selector 52 uses acknowledgements to eliminate the requirement of a bus controller (and the additional time delay a controller introduces). In this alternate arrangement, an "ACK/NACK" technique is used to resolve "bus contentions" that occur whenever two digital receivers 54 try to simultaneously transmit messages over bus 56. Using this technique, each digital receiver 54 can autonomously transmit on bus 56 as soon as it receives a message so long as no other digital receiver is already actively transmitting. Digital selector 52 receives all messages transmitted on bus 56, places a responsive "acknowledgement" (ACK) message onto the bus whenever it correctly receives a message, and places a "negative acknowledgement" (NACK) message onto the bus whenever it incorrectly receives a message. Since upon the occurrence of a bus contention digital selector 52 does not correctly receive any of the contending messages, it sends a NACK signal which causes both of the transmitting digital receivers 54 to resend their messages. This technique thus avoids the time overhead involved in polling and would appear to provide a very efficient solution to a multi-site trunked digital voter.

However, this ACK/NACK arrangement described above cannot provide satisfactory performance in a digital voter for a trunking system such as GE's PST system—because it is possible *and probable* that multiple digital receivers will simultaneously attempt to transmit on bus 56. This is because all satellite sites typically receive a given transmitted RF message at about the same time (slight variations in receive time are attributable to different RF path lengths between the transmitting station and the satellite receiver stations) and communicate the received messages to the voter at about the same time (variations in communication time are attributable to differences in landline distance for example). Thus, it is highly probable that several versions of the same message will arrive almost simultaneously at different voter digital receivers 54. Each of the different voter digital receivers 54 may then use "carrier sense" or some other similar technique before attempting to transfer their received message to the selector to ensure that bus 56 is not in use —but will find that the bus is not in use (since none of the other digital receivers which have received versions of the same message have yet had the chance to begin transmitting). Consequently, some or all of the digital receivers 54 will begin transmitting on bus 56 virtually simultaneously—causing a "bus collision" which prevents digital selector 54 from correctly receiving any of the messages placed on the bus. While the ACK/NACK technique typically will eventually resolve the contention (e.g., especially when used in conjunction with a "random retry" or other technique preventing further bus collisions by the contending digital receivers 54), the contention resolution takes far too much time and introduces too much delay into the voting process.

Various bus contention resolution schemes are known in the computer field for efficiently resolving contentions on a common bus. The following is a (by no means exhaustive) listing of a few examples of such contention resolution schemes:

U.S. Pat. No. 4,628,311 to Milling
U.S. Pat. No. 4,623,886 to Livingston
U.S. Pat. No. 4,395,710 to Einolf Jr. et al
U.S. Pat. No. 4,638,311 to Gerety
U.S. Pat. No. 4,644,348 to Gerety
U.S. Pat. No. 4,652,873 to Dolsen et al
U.S. Pat. No. 3,701,109 to Peters
U.S. Pat. No. 4,232,294 to Burke et al
U.S. Pat. No. 4,593,282 to Acampora et al
U.S. Pat. No. 4,642,630 to Beckner et al
U.S. Pat. No. 4,583,089 to Cope
U.S. Pat. No. 4,677,612 to Olson et al
U.S. Pat. No. 4,682,324 to Ulug
U.S. Pat. No. 4,707,693 to Hessel However, it is not readily apparent if or how any of the techniques described in the patents listed above might be applied to a digitally trunked communication system satellite receiving site digital voter. In particular, the digital voter requirements for the GE 16 PLUS digitally trunked PST communications system are highly unusual and are not readily analogous to, for example, the peripheral bus of a computer system or a local area network (LAN).

In the case of a computer system peripheral bus or LAN, for example, the statistical probability of two nodes transmitting during a certain time period generally is directly proportional to the duration of the time period. It is relatively unlikely that two nodes will need to independently initiate a new bus communication at exactly the same instant in time (i.e., unless the bus or LAN has been unavailable for awhile because of other communications or the like or unless the peripheral communications are actually being initiated in response to the same previous bus communication). On the other hand, it may be relatively likely that two nodes will need to transmit at nearly the same time (e.g., depending upon the number of nodes on the bus/LAN and various other factors). Thus, the probability of a contention on the "macro" level (e.g., overlapping but not exactly simultaneous communications) is much higher than the probability of a contention on the "micro" level (e.g., where two nodes need to transmit beginning at almost exactly the same time). In addition, the problem of redundant contending messages (and "redundancy removal") does not exist on a LAN or peripheral bus—since all of the contending messages need to be communicated sooner or later.

In contrast, in the GE PST system presents entirely different contention problems because of system considerations. In particular, in the GE PST system all "inbound" messages are transmitted beginning at the edge of a 30 ms "slot edge" (defined by synchronization signals on the outbound control and working channels, with the sync signals on each working channel being synchronized with the control channel sync signals). If two mobile/portable transceivers attempt to transmit at or near the same time, their transmissions will either fall within different inbound slots (and thus be separated by 30 ms)—or they will fall within the same slot (and thus be virtually simultaneous). However, a contention between RF signals on the inbound control channel typically results in destroying both transmissions and causing both contending transmitters to "retry" (e.g., using random retry wait periods).

Hence, it is highly probable in the GE PST System that all satellite sites receiving a message within a given inbound "slot" will be receiving the same message! Likewise, the digital receivers 54 associated with the satellite sites will receive the corresponding digital messages (and thus need to apply the messages to the bus 56) virtually simultaneously. These messages are therefore likely to be redundant versions of the same message of which only one version needs to be selected and communicated to digital selector 52 (and the non-selected versions of which should be discarded immediately to allow the receivers to handle messages in the next incoming slot).

Hence, in the GE PST system, the probability of "macro" contentions on bus 56 is small or nonexistent, the probability of "micro" contentions is relatively high (in fact, virtually all contentions will be of the "micro" variety), and the it is extremely likely that contending messages will be redundant versions of the same message.

A prior approach by Brown et al described in copending patent application Ser. No. 07/364,907 filed on Jun. 12, 1989 has proven to be highly successful in overcoming many/all of the problems described above. That prior approach provides a digital voter arrangement which uses a "windowing" technique to arbitrate bus contention on an asynchronous common communication link. This digital voter arrangement reduces communication latency by entirely eliminating bus assignment by a controller (and eliminates the corresponding message overhead required by the controller), yet still prevents message collisions on the common bus and efficiently eliminates most of the redundant messages.

Briefly, in the prior Brown et al approach a "serve request" type communications line (FSL) connects a plurality of digital receivers (receiving messages from corresponding plural RF receiving sites) contending for use of a serial data line (BSL). Data is transmitted from the digital receivers to a digital selector over the BSL. Bus collisions are prevented and redundancy removal is provided through two interrelated mechanisms.

The first mechanism relates to the FSL, which is normally in an inactive state but can be seized (controlled) by any of the plural digital receivers. When a digital receiver has received a message from its associated satellite receiver and wishes to transfer this message to the digital selector, it must first gain access to the FSL (no digital receiver is authorized to transmit on the BSL unless it has first seized the FSL). To gain access to the BSL, it tests the state of the FSL. If the FSL is inactive, the digital receiver seizes the FSL in preparation for transmitting on the BSL. In the preferred embodiment, whenever a digital receiver seizes the FSL, it continues to hold the FSL in the active state for the duration of a redundancy removal period. Any digital receiver having a message to transfer on the BSL which finds the FSL already seized assumes in the preferred embodiment that its message is redundant with the one to be transmitted by the digital receiver already controlling the FSL and therefore discards its message.

The arbitration performed by the FSL mechanism is, however, generally insufficient to eliminate all collisions on the BSL in the GE PST system. This is because it is possible in the GE PST trunking system that, due to the synchronized "slotted" nature of all incoming RF messages from mobile/portable transceivers, several digital receivers will successfully seize the FSL at about the same time. Thus, in this environment successful seizure of the FSL does not guarantee exclusive access to the BSL. Accordingly, Brown et al provide a further mechanism to prevent BSL collisions and remove further redundant messages.

Briefly, this further mechanism involves assigning a unique "start transmission" time window to each digital receiver contending for the BSL. Each digital receiver which has successfully seized the FSL times a duration unique to it beginning from the time it seized the FSL. During this duration, the digital receiver "listens" on the BSL for the start of transmission of a digital receiver having an "earlier" window assignment. If no start of transmission is detected by the time the digital receiver's unique delay time has elapsed, the digital receiver begins to transmit its message on the BSL. Digital receivers with "later" window assignments will detect this transmission, abort their own attempts to transmit on the BSL, and discard those messages—thus preventing message collisions on the BSL.

The Brown et al system has been highly successful. However, it has a shortcoming in that it provides no mechanism to select the "best" received digitized message. When received analog signals are being voted upon, it typically does not matter which of several received analog signals is selected by the voting process so long as all of those several signals have acceptable received signal strength (RSSI) (the intelligibility of each of the different signals can be guaranteed to be acceptable so long as each of the signals is received at above a certain minimum acceptable signal strength). Digitized speech and other digital messages present vastly different considerations, however. For reliable decoding of digital messages, it is important that the very "best" version of the message (i.e., the version of the message received with the least amount of errors) is used for decoding and other further processing.

It would be highly desirable to provide a digital voter for a high data rate digitally trunked radio communication system that eliminates data collisions on the voter bus, removes most or all redundant messages, does not significantly impact system latency, and selects the most reliable (i.e., most "error free") version of the digital message.

The term "Voice Guard" as used by General Electric Company typically refers to digitized encrypted speech. There is often a need in modern trunked RF communications systems to provide secure voice (or data transmission), and this need is typically solved by digitizing the speech at the transmitter end and then subjecting the digitized speech to some form of encryption (e.g., the well-known DES encryption standardized by the National Bureau of Standards) before transmitting the speech over a communications channel. The speech is decrypted (using for example a similar DES decryption technique initialized with a decryption "key" matching the key used at the transmitter for the encryption process) and converted back into analog form at the receiver. To decrypt and decode the transmitted speech, an eavesdropper would have to use appropriate decryption circuitry initialized with the same decryption "key" used by the transmitter and the intended receiver. There are hundreds of millions of possible such keys, making it extremely unlikely that an unintended receiver could successfully decrypt and decode the transmission.

The present invention relates to an improvement on the Brown et al digital voting technique to enable that technique to process digital Voice Guard signals and other digital messages—and specifically to enable the voting process to select the "best" version of several different received versions of the digital/digitized message.

Briefly, voting begins when a digital receiver receives a block of voice guard data (this block corresponding to a frame in the preferred embodiment) from its associated remote receiver. The digital receiver calculates an indication of the amount of error in the received signal (e.g., BERC —"bit error rate code" in the preferred embodiment) and uses this indication to generate a further value based on the current and recent past error indications. The digital receiver then attempts to send a message to the digital selector indicating that it has block of Voice Guard data to send to the main site. This message functions as a request to send a block of data.

The selector acquires control of the bus connecting the selector to the digital receivers (e.g., by asserting a bus control line). The digital selector then, in the preferred embodiment, delays a period of time equal to the longest delay time associated with a digital receiver. This longest delay time accounts for the transmission delay between remote receiving sites and associated digital receivers (the remote receiving sites are typically located different distances from the voter) and also accounts for the time it takes a digital receiver to calculate the error indication discussed above. Thus, this longest delay time ensures that all of the digital receivers receiving redundant versions of the message will have already received those message versions and calculated BERC values by the time the digital selector acts.

After waiting this longest delay time, the digital selector sends a message to all of the digital receivers requesting the receivers to send their block of data (if they have received one) over the common bus. Each digital receiver uses the message transmitted by the digital selector as a timing synchronization pulse ("clear to send") to start an internal transmit timer. The digital receivers transmit their respective received data blocks after waiting respective delay periods timed by their respective transmit timers. The delay period waited by a particular digital receiver is determined based on a predetermined "transmit slot number" uniquely associated with the digital receiver, the error indication calculated by the digital receiver, and a further constant value (which assures a sufficient minimum spacing in time between the transmissions of two digital receivers to allow the later-transmitting receiver to detect that the bus is in use and abort transmission).

The digital receiver having the "best" data to transmit (i.e., having calculated the lowest BERC) is thus the first digital receiver to transmit —and all other digital receivers having data to transmit simply abort their transmission upon sensing the first transmission.

In the preferred embodiment, the times during which the digital receivers may transmit the received data over the common bus may be considered to be divided into "windows" of time. In the preferred embodiment, there is a sequence of several (e.g., ten or fifteen) time windows (W(1)−W(n) corresponding to several different BERC values 1−n (the total time taken up by this sequence of windows is less than the time it takes for a new message to be received by a remote site, transmitted from the remote site to its associated digital receiver, and received and processed by the digital receiver to provide a BERC indication).

Any digital receiver calculating a BERC value of 1 (on the order of zero percent received bit error) will attempt to transmit in the first window W(1) in the sequence. Any digital receiver calculating a BERC value of 2 (corresponding to a slightly higher error rate) will attempt to transmit in the next window W(2) within the sequence of windows but will abort its transmission if it detects a digital receiver transmission in window W(1). Similarly, any digital receiver calculating a BERC value of n (corresponding to the poorest error rate) will attempt to transmit its received block of data in the last window W(n) but will abort its transmission if any digital receiver transmits in any of the preceding windows W(1)−W(n−1). Hence, transmission of a low BERC message on the bus will prevent digital receivers from transmitting higher BERC messages on the bus—providing removal of redundant messages and ensuring that the digital selector receives only the message with the lowest BERC.

It is possible for two or more digital receivers to receive a message with the same BERC— so that two or more digital receivers must contend for the same window W(1)−W(n). To prevent such contentions in the preferred embodiment, each of windows W(1)−W(n) is divided into a sequence of transmit time slots S(1)−S(m) corresponding to the number of digital receivers 1−m (in the preferred embodiment, this number m=63 so that up to 63 remote sites and associated digital receivers can be accommodated). Each digital receiver is preassigned a unique slot number 1−m. The time within a BERC window that a particular digital receiver may transmit depends on the slot number preassigned to the digital receiver.

Assume that two digital receivers R(1) and R(2) (the numbers 1 and 2 corresponding to preassigned slot numbers) have both received a message with BERC=0 and thus both attempt to transmit during BERC time window W(0). Digital receiver R(1) will transmit first during transmit slot S(1). Digital receiver R(2) is scheduled to transmit during slot S(2) (later than slot S(1)) but upon detecting the transmission it aborts its transmission. Thus, not only are bus contentions avoided, but further redundant message removal is also provided.

In the preferred embodiment, it is important that the data rate on the voter bus is significantly higher than the data rate on the communications lines between the satellite receiving sites and the voter. This is because the voting process and the transmission of a block of data over the voter bus must be finished in no more than the time it takes for a new block of data to arrive at a digital receiver from a remote receiving site. In the preferred embodiment, the voter bus data rate is 19.2 kilobaud whereas the data rate on the links between the remote receiving sites and the voter is 9600 baud—thus providing the necessary time for the voting and transfer of data from a digital receiver to the digital selector.

Once the selected digital receiver has finished transmitting the received block of data, it waits until another full block of data has been received from its associated remote receiving site. It then calculates a new BERC error indication and tries to send a message to the digital selector indicating that a new message has arrived and is ready to be voted upon. Voting occurs on a block-byblock (frame by frame) basis with each block being voted on independently.

BRIEF DESCRIPTION OF THE DRAWINGS

These and other features and advantages of the present invention will be better and more completely understood by studying the following detailed description of the presently preferred exemplary embodiments in conjunction with the FIGURES, of which:

FIG. 1 is a schematic block diagram of a prior art digital voter system;

FIGS. 1A and 1B are schematic block diagrams of a prior art PST RF trunking system to which the digital voter system of the preferred embodiment of the present invention is particularly applicable;

FIG. 2 is a schematic block diagram of the presently preferred exemplary embodiment digital voter system in accordance with the present invention;

FIG. 3 is a schematic illustration of an exemplary sequence of time "windows" defining timing on the common BSL bus shown in FIG. 2 further divided into a sequence of time "slots" corresponding to each of N exemplary digital receivers;

FIGS. 4 and 5 are graphical timing diagrams of signals present in the FIG. 2 digital voter system; and FIGS. 6A-6B together are a schematic flowchart of exemplary program control steps performed by an exemplary one of the digital receivers shown in FIG. 2 upon receipt of a block of data from its associated remote receiving site;

FIG. 6C is a flowchart of exemplary program control steps performed by the preferred embodiment digital selector and FIGS. 7-11 are schematic state transition diagrams of exemplary state transitions performed by the FIG. 2 voter in the preferred embodiment.

DETAILED DESCRIPTION OF A PRESENTLY PREFERRED EXEMPLARY EMBODIMENT

Figure 1A:
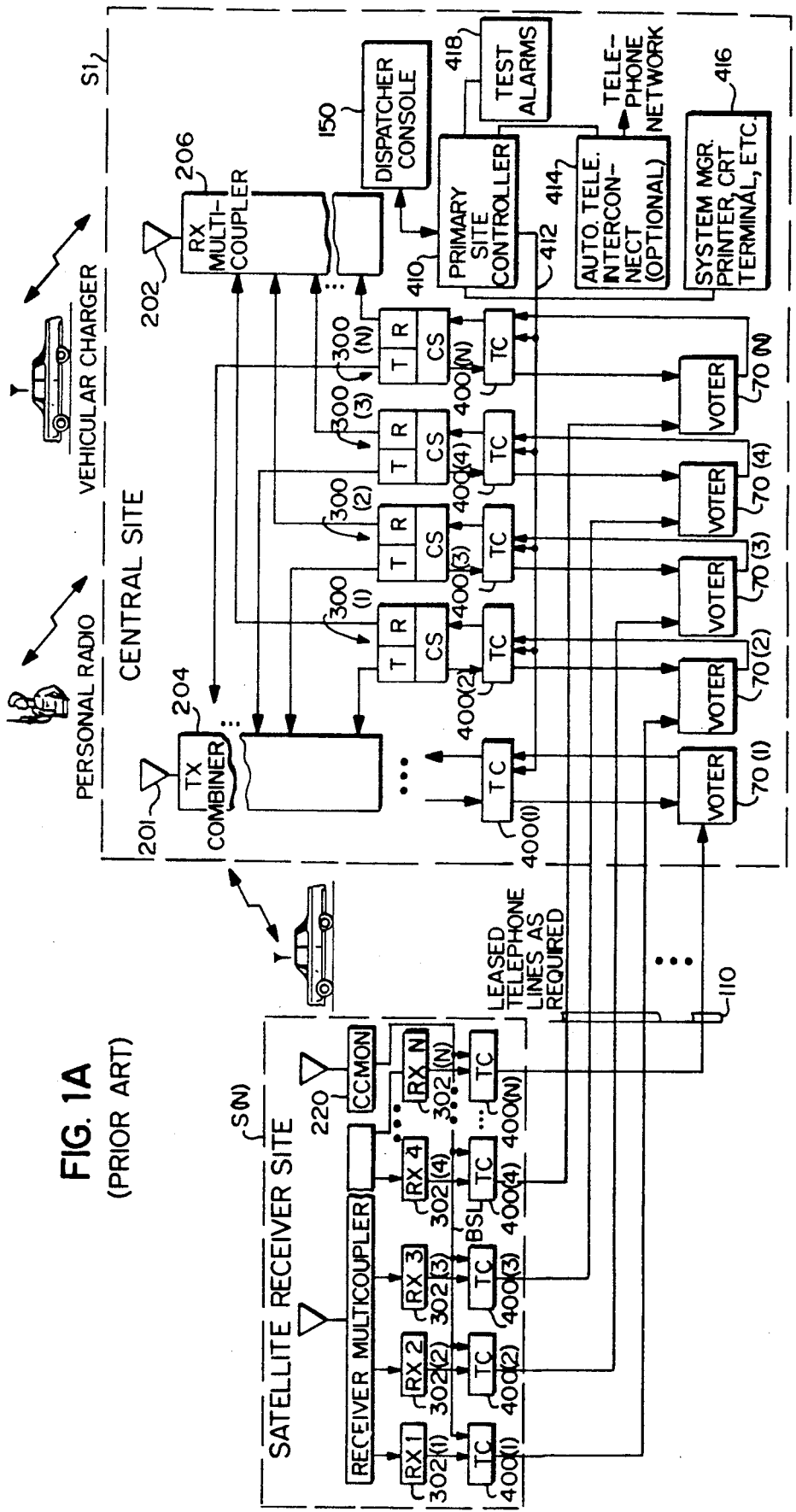

FIGS. 1A and 1B are schematic block diagrams of a prior art digital RF trunking system in which the digital voter of the present invention may be used with particular advantage. The digital RF trunking system shown in FIGS 1A and 1B is the General Electric Company 16 PLUS Digitally Trunked Public Service Radio System. Referring to FIG. 1A, this system may include a central site S1, one or more satellite receiving sites S(2)−S(N), and a central dispatch console "station" (shown in FIG. 1A as part of main site S1 but typically located elsewhere). As will be appreciated, satellite receiving sites S(2)−S(N) (only one of which is shown in FIG. 1A, but an arbitrary number of which may be provided) are displaced spatially from the central site S1 such that radio reception of a particular RF transmission may temporarily be better at one than the other of the satellite receiving sites. Received signals from the satellite sites S2-SN as well as signals received by the main site S1 are combined by voter circuits 70 so as to select an acceptable signal for control or communication processing.

At the main site S1, a transmitting antenna 201 and a receiving antenna 202 (which may be a common antenna structure) may be utilized with conventional signal combining/de-combining circuits 204,206 as will be apparent to those in the art. Transmitting and receiving RF antenna circuitry 201-206 are connected to a plurality of duplex RF channel/receive circuits included in a plurality of RF repeater stations 300(1)-300(24). Typically, there may be as many as 24 such stations for 24 corresponding RF duplex channels (including a control channel). Each station transmitter and receiver circuitry is typically controlled by a dedicated control shelf CS (e.g., a microprocessor-based control circuit) as is also generally depicted in FIG. 1A. Such control shelf logic circuits associated with each station are, in turn, controlled by "trunking cards" TC (e.g., further microprocessor-based logic control circuits) 400(1)-400(24).

Trunking cards 400 communicate with one another and/or with a primary site controller 410 via control data bus 412. The primary site control may be a commercially available general purpose processor such as a DEC PDP-11/73 or the like. Although the major "intelligence" and control capabilities for the entire system resides in controller 410, alternate backup "failsoft" control functions are incorporated in the trunking cards 400 so as to provide continued trunked repeater service even in the event that controller 410 malfunctions or is otherwise taken out of service.

The voters 70 are connected so as to receive a plurality of input digital and/or analog signals and to selectively output therefrom an acceptable (e.g., the strongest and/or most reliable) one of the input signals. In the preferred embodiment, a voter 70 is provided for each RF channel operating on the trunking system. Thus, signals received on exemplary RF duplex channels 1-24 by main site S1 are input to respective ones of voters 70(1)-70(24), while additional similar input signals are generated from satellite receiver sites S(2)-S(N) (each of which also receive on exemplary channels 1-24) are also input to the appropriate respective voters 70(1)-70(24). The results of the voting process performed by voters 70 are then passed to respective main site trunking card circuits 400(1)-400(24) where there are further processed as valid "received" signals.

As mentioned above, one of the 24 duplex RF channels supported by the FIG. 1A system is assigned to be a control channel. Digital control information (e.g., channel assignments and the like) is transmitted by the main site S1 on the "outbound" frequency of this duplex control channel, and further digital control information (e.g., channel assignment requests) is transmitted on the inbound control channel frequency by mobile/portable transceivers. In the preferred embodiment FIG. 1A system, all mobile/portable transceivers monitor the outbound control channel signal stream transmitted by main site S1 when they are not actually engaged in ongoing communications on another channel (a "working channel"). Under the direction of control signals transmitted by main site S1 over the outbound control channel, certain individual or groups of mobile/portable transceivers may be directed to a working channel to communicate with other mobile/portable transceivers, the dispatcher and/or a landline caller. When the communications terminates on the working channel, the mobile/portable transceiver(s) return to monitoring the control channel.

In the FIG. 1A system, all communications across all channels are synchronized with the signal stream on the outbound control channel. The trunking card 400 assigned as the main site S1 control channel trunking card generates synchronizing signals defining 30 ms "slots", transmits these synchronizing signals over the outbound control channel frequency, and also applies these synchronizing signals to the other trunking cards 400 (as will be explained shortly). All mobile/portable transceivers synchronize with the outbound control channel sync signals while they are monitoring the outbound control channel. The mobile/portable transceivers then transmit messages on the inbound control channel frequency within inbound "slots" defined by the outbound control channel synchronizing signals. Each message is transmitted within a single "slot" and is always transmitted beginning at a slot or frame "edge" defined by the outbound control channel sync signals transmitted by the main site S1.

In the FIG. 1A system, the control channel handles only digital messages, but the working channels are each capable of handling various types of signals including digital signals, analog "clear voice" signals, and digitized encrypted voice signals (Voice Guard). To increase flexibility, the FIG. 1A system can operate any of its exemplary 24 RF channels as a control channel (so that, for example, if the "control channel" hardware fails any working channel can become the control channel to replace the failed hardware). This means, of course, that each of voters 70 must be capable of processing both analog and digital signals, and that each of the voters must also be capable of performing any special processing of digital signals required for the control channel.

A slightly more detailed view of main site S1 shown in prior art FIG. 1B. Here it will be seen that a backup serial link (BSL) and a synchronization line (FSL) connect all of trunking cards 400. The FSL line is used to convey the control channel synchronization signals to all of the trunking card modules (and is typically driven by the single trunking cards 400 assigned as the control channel trunking card). The backup serial link BSL carries data in serial form between the trunking cards (e.g., when the system is operating in "fail soft" mode due to failure of the site controller 410). More details concerning the interaction between the trunking cards via the FSL and BSL lines may be found, for example, in commonly assigned copending application Ser. No. 07/057,046 filed Jun. 3, 1987 (which application is hereby incorporated by reference herein).

As described previously, the main function of satellite receiving-sites S2–SN is to receive and validate inbound messages and pass them along to digital voter 100 so duplicate messages can be discarded. Referring once again to FIG. 1A, it can be seen that the architectures of the satellite receiving sites S2–SN are very similar to that of the main site S1. Specifically, each satellite receiving site includes RF receivers 302(1)–302(N) (no transmitters are provided because the satellite receiving site has no transmit capability) and associated trunking cards 400(1)–400(N). In the preferred embodiment, a control channel monitor 220 located at each received site S2–SN continuously listens to the outbound control channel transmissions of main site S1. This control channel monitor 220 receives and validates the slotted outbound control channel messages, strips off the dotting, Barker, and repeats, and sends the messages through a buffer onto a backup serial link (BSL) of the type described, for example, in copending commonly assigned application Ser. No. 07/056,046 cited above. The BSL thus synchronizes all trunking cards 400 located at the satellite site with the main site S1 outbound control channel. To preserve slot timing, the two 28-bit control channel messages typically found in an outbound control channel slot are concatenated and sent sequentially in the form of two 4-byte messages every 30 milliseconds (the filler nibble used to complete the fourth byte contains a bit indicating slot position). One of the trunking cards 400 located in each satellite receiving sites S2–SN is designated as the control channel and uses the reception of the first byte on the BSL as a timing reference for inbound control channel messages (and thus can synchronously receive those inbound control channel messages with reduced falsing rate). The control channel monitor also provides operating mode status and—in working channel mode—call type information (i.e., clear voice, Voice Guard, etc.).

FIG. 2 is a high level schematic block diagram of a presently preferred exemplary embodiment of a voter system 70 in accordance with the present invention. The principal function of digital voter 100 is to receive messages from receiving sites S1–SN, select only (any) one version of redundant digital receiver outputs, and relay the selected output to main site S1. As mentioned above, this function of voter system 70 effectively equalizes talk-out and talk-in range of hand held (or other low power) transceivers. Typical base station transmitters have power outputs that exceed a hand held transceiver output by over 20 dB. If hand held and mobile transceivers are to have equal coverages (which is a requirement for most public service systems and for other systems as well), a number of geographically dispersed satellite receiving stations is needed. Some existing systems have over forty satellite receiving sites. Voter systems 70 provide the mechanism for selecting one acceptable version of redundant signals received by main site SI and the various satellite sites S2–SN and for passing the selected signal to main site S1 for further processing.

The voter system 70 shown in FIG. 2 provides voting functions for a single RF channel of the trunked radio repeater system (thus, there are typically multiple such FIG. 2 voter systems—one for each channel in the system).

Voter system 70 includes a digital voter 100 which votes on digital messages received from main site S1 and satellite sites S2–SN, discards redundant messages, and passes on only a single version of each digital message to main site S1 for further processing. In the preferred embodiment only a single communications link 110 is provided for each channel between each radio site and each voter. That is, a telephone line communications link 110(1) connects voter 70(1) to for example a given main site working channel A trunking card, a telephone line communications link 110(2) connects the satellite receiving site S2 working channel A trunking card to voter 70(1), etc. Similarly, voter 70(2) processing signals for channel B will have a corresponding array of telephone line links 110 connecting it to the main site channel A trunking card and to each satellite site trunking cards for channel B. These links 110 in the preferred embodiment carry digital signals at the rate of 9600 baud.

Now that the overall functionality of digital voter 100 and the environment in which the voter operates have been discussed, a description of how the digital voter votes on received messages in order to avoid message collision, eliminate redundant messages, and still minimize system latency will be presented.

As can be seen in FIG. 2, digital voter 100 includes digital selector 102, plural digital receivers 104(1)–104(N) corresponding to and associated with receiving sites S1–SN, a backup serial link 106, and a sync line (FSL) 108. The digital receivers 104 transmit data to selector 102 over the BSL 106 (and selector 102 in the preferred embodiment sometimes transmits data to the digital receivers over this link). The FSL 108 is used to help avoid collisions on the BSL 106 and for redundancy removal—as will be explained in much greater detail shortly.

Thus, backup serial link (BSL) 106 and the sync line (FLS) 108 are used for communicating information between digital selector 102 and digital receivers 104. While this dual bus architecture is similar to that used in the main site and satellite site architectures (see prior art FIGS. 1A and 1B), the actual functions performed by BSL 106 and FSL 108 within digital voter 100 are very different from the functions corresponding counterparts of these buses performed within the site architectures as will become apparent shortly.

In the preferred embodiment, the FSL line 108 within digital voter 100 is used by digital receivers 104 as a "service request" line to determine whether BSL 106 is in use. Thus, FSL 108 is monitored by and can be controlled by each (every) one of digital receivers 104. FSL 108 in the preferred embodiment of digital voter 100 may be thought of the "first line of defense" for avoiding collisions on BSL 106 and for removing redundant messages.

Briefly, when a digital receiver 104 has received a message to be passed to digital selector 102, it first checks the state of FSL 108. Only a digital receiver 104 which discovers the FSL 108 is inactive and then seizes control over the FSL is permitted to transmit data on the BSL 106. If FSL 108 is active (indicating the BSL is in use) when the digital receiver 104 tests its state, the digital receiver 104 assumes that its own message is redundant and immediately discards this message. When a digital receiver 104 gains control of FSL 108, it seizes the FSL by changing the state of the FSL line (e.g., by "pulling down" the level of the line to an active logic low level). Changing the state of the FSL 108 alerts all other digital receivers 104 (and digital selector 102) that the BSL 106 is in use. The seizing digital receiver 104 keeps the FSL in the active low state for a preset duration (corresponding to the voter "redundancy removal" period, as will be explained). Any other digital receivers 104 receiving messages during this redundancy removal period simply discard their messages—thus minimizing data collision on the BSL 106 and also effecting removal of redundant messages.

Even though two digital receivers 104 are granted access to BSL 106 at approximately the same time, they do not begin transmitting data on the BSL at the same time. To eliminate data collisions on BSL 106 in the event that more than one digital receiver 104 has seized FSL 108, each digital receiver 104 in the preferred embodiment does not transmit its message immediately upon seizing FSL 108 but instead each waits a predetermined unique time period (i.e., the waiting period for each digital receivers is different) after it seizes the FSL before transmitting its message over BSL 106 to digital selector 102. During this waiting period, the digital receiver 104 closely monitors the BSL 106 for signals. If a digital receiver 104 detects a signal on BSL 106 during its waiting period, it aborts its attempt to transmit on the BSL and discards its message. If a digital receiver 104 (after seizing the FSL 108 and while it is waiting to transmit on BSL 106) detects a start bit on the BSL, that digital receiver discards its message and aborts its attempt to transmit over the BSL.

Thus, in the preferred embodiment a window defines a time duration in which the digital receiver 104 assigned to the window can begin transmitting on the BSL 106—and not possibly (as in some systems) a time duration within which the assigned digital receiver has true exclusive access to the BSL. The windows do not define, for example, time slots of the type used in a conventional time division multiplexed digital frame structure, since in such TDM frame structures each time slot must have sufficient duration to "contain" an entire message from the mode assigned to the slot. Since a given message transmitted on the BSL 106 typically occupies many windows in the preferred embodiment, many digital receivers can possibly transmit during a given window W(i)—but only one digital receiver 104(i) is authorized to begin to transmit during that time period.

Referring to FIG. 3, The sequence of time slots S within a particular window W thus establishes a predetermined sequence in which digital receivers 104 contending for access to BSL 106 may begin transmitting and ensures that no two digital receivers will ever attempt to begin transmitting at exactly the same time. Moreover (as will be explained in greater detail shortly), the durations of time slots S in the preferred embodiment are long enough to ensure a sufficient minimum spacing (in time) between the instants at which different digital receivers can begin transmitting to allow any arbitrary digital receiver 104(k) scheduled to begin transmitting in assigned slot S(k) sufficient time to abort transmission in response to detected start of transmission of the digital receiver 104 possibly scheduled to begin transmitting beginning in the immediately preceding slot $S(k-1)$ (the word "possibly" is used because scheduling of begin transmit times depends in the preferred embodiment upon variables (BERC) as well as fixed information (digital receiver preassigned address).

Consider a manufacturing assembly line as a very simplified but somewhat illustrative analogy to the time slot protocol arrangement of the preferred embodiment. Picture a plurality of assembly line workers on a moving belt type assembly line. The moving belt conveys partially assembled machines. All of the assembly line workers in this particular part of the assembly line have the same task of installing a specific part (e.g., a bolt) into the machine. However, the belt moves too rapidly for a single worker to install a bolt into every machine that goes by. Instead, the workers space themselves linearly along the belt. If a machine without a bolt yet installed reaches a worker who is holding a bolt and is ready to install it, the worker installs the bolt into the machine (e.g., by walking along the assembly line with the machine until the bolt installation is complete). If the worker is not ready to install a bolt, however, he lets the machine pass him by and another worker further down the line installs the bolt. The workers space themselves apart along the assembly line (and thus arrange themselves into a predetermined sequence with respect to any given machine travelling down the line) so that the workers do not get into one another's way and so that two workers never try to install bolts into the same machine. By the time a machine reaches a particular worker, that worker always can easily determine whether or not he needs to install a bolt into that machine. Workers at the front of the assembly line will, if conscientious, install many more bolts than workers near the end of the line (since all or most machines that pass by the front workers need bolts). The very last worker on the line may only install a bolt very occasionally—his main job is to inspect every machine that leaves his area to make sure it has a bolt installed and to install bolts in the few machines that all of the other workers missed.

In a somewhat similar fashion, the sequence of time slots S within a particular window W in the preferred embodiment establishes an order in which digital receivers 104 may begin to transmit data over BSL 106. Once a digital receiver 104 earlier in the sequence begins to transmit, no digital receiver later in the sequence will attempt to transmit. Thus, no two digital receivers 104 will ever attempt to transmit on BSL 106 simultaneously —just as no two assembly line workers in the analogy discussed above will ever attempt to install bolts into the same machine—due to the predetermined sequence in which the digital receivers (assembly line workers) are arranged.

The time slots S in the preferred embodiment are very much shorter than the time it takes for a digital receiver 104 to transfer a message to digital selector 102. In the preferred embodiment, the duration of the various time slots S is determined not by how long it takes for a digital message to be transferred over from digital receiver 104 to digital selector 102—but rather by the amount of time it takes for a digital receiver to detect the "start" bit of such a message being transferred over the BSL and to successfully abort its own transmission of a redundant message. However, the time duration of time slots S must also take into account another factor—the inherent inaccuracy of detecting the transmission of the FSL 108 by digital receivers 104.

Redundancy removal relates to the effectiveness of digital voter 100 at discriminating between redundant and non-redundant messages. When a mobile or portable radio transceiver transmits a message, some or all of satellite receiving sites S(2)-S(N) may receive a version of the message and the main site S1 may also receive a version of the message. Redundant messages are thus all versions of a message having the same radio transceiver (portable or mobile) as their source. Redundancy removal in the preferred embodiment voter 100 is based on the assumption that all messages received by the receiving sites at the same instant in time (or within a given time frame accounting for RF path length differences) by all sites—all messages reported by those receiving sites to voter 100 within a "redundancy removal" time frame—have their origin in the same transmission by a single source radio. This assumption is not always absolutely correct, but in the preferred embodiment radio trunking system the assumption is workable or practical for the following reasons.

In the preferred embodiment RF trunking system, inbound control channel messages are "slotted"—meaning that they always begin upon the occurrence of a 30 ms frame edge. Since all mobile/portable transceivers synchronize to a common main site S1 outbound control channel in the preferred embodiment, all mobile/portable transceivers operating in the trunking system will "agree" (within time uncertainties attributable to unequal RF propagation delays) on when this common frame edge occurs. Two RF transceivers that are keyed at nearly the same time will thus transmit either at virtually exactly the same instant (each waits until the occurrence of the next control channel frame edge to occur before transmitting) or separated by a 30 ms "slot" (so that the two transceivers transmit in different slots altogether).

In the event that two geographically proximate transceivers send in the same slot, the resulting RF signal collision will typically result in destroying both transmissions and thus prevent any receiving site from correctly receiving either transmission. In this situation, neither transceiver will receive a responsive message from the main site S1 over the outbound control channel, and each will utilize a "random retry" technique to retransmit their respective messages while avoiding further RF collisions (see U.S. application Ser. No. 07/056,922 to Childress).

If however, the two transceivers transmitting within the same slot are geographically separated from one another, it is likely that a satellite receiving site S(i) close to a first of the two transceivers will receive the transmission of that first transceiver while a further satellite receiving site S(j) close to the other transceiver will receive the transmission of the other transceiver. Satellite receiving sites S(i), S(j) will thus each report a valid message to voter 100 for that slot, and these two valid messages will arrive at voter 100 at about the same time. Voter 100 in the preferred embodiment erroneously assumes that the two messages it has received from satellite receiving sites S(i), S(j) are redundant versions of the same message, selects one of the messages, and discards the other. Thus, only one of the two messages will be relayed to main site S1 for response. This effect is similar to the destructive RF collision discussed above (which the transceivers overcome using a retry technique)—with the improvement that one of the two messages is in fact passed on by voter 100 to main site S1 (in the RF collision situation, both RF messages are corrupted and neither message typically "gets through").

Given the redundancy removal assumption discussed above and the slotted nature of inbound channels in the preferred embodiment, it will be evident that in the preferred embodiment there is a macro time relationship between all redundant versions of the same message reported to voter 100 from different sites. Once the maximum time difference in message delay between the sites (e.g., attributable to RF path length differences, differences in landline propagation delay from the sites to voter 100, and the like) is known, all messages arriving at the voter within this time difference can safely be assumed by voter 100 (given the assumption described above) to be redundant versions of the same message.

Each digital receiver 104 in the preferred embodiment has the architecture of a conventional trunking card 400 but has stored therein special program control code which provides the digital receiver functionality described below. In the preferred embodiment, each digital receiver 104 is a microprocessor-based signal processor executing program control instructions stored in a read only memory to provide the program control steps shown in the FIG. 6 flowchart herein. These program control instructions also provide the state transitions shown in FIGS. 7-11 and described in great detail in the attached APPENDIX. The preferred embodiment voter system 70 shown in FIG. 2 handles all of the call types currently handled by the GE PST system, including:

Clear Voice;
Special Calls;
Voice Guard; and
Data.

A description of how voter system handles clear voice, special call and data messages may be found in copending application Ser. No. 07/364,907 of Brown et al referenced above. The following discussion presented herein concentrates on the manner in which voter system 70 handles Voice Guard digitized speech messages in the preferred embodiment.

Briefly, digital voter 100 in the preferred embodiment votes on Voice guard (encrypted voice) data by voting on different versions of received encrypted voice signals on the basis of least bit error rate (BER).

In the preferred embodiment, the satellite site trunking card which is currently assigned as the control channel detects Voice Guard channel request from the calling mobile unit. This Voice Guard channel request is relayed through the voter 100 exactly the same as a clear voice channel request would be. The site responds with a Voice Guard channel assignment which is sent out on the outbound control channel.

Working channel satellite receivers receive the Voice Guard channel assignment on their serial port coming from the control channel monitor mobile and enter a state in which they are looking for a Voice Guard transmission on the RF port. The sites remain in a sync acquisition mode until VG ("Voice Guard") sync is obtained, late entry is achieved, or a new channel assignment is sent from the control channel monitor. Obtaining sync requires detection of at least two consecutive sync packets, and late entry requires detection of one frame header which contains no errors in Barker, OA, and SIG fields (in the preferred embodiment), followed by another frame header with no more than eight bit errors in the same fields.

Once the Voice Guard message is detected, the satellite receiver must maintain sync while transmitting the data stream on the communications link 110 to its associated digital receiver 104. If the satellite receiver loses sync before an end of message (EOM) signal is detected, it immediately interrupts the Voice Guard data stream and begins transmitting continuous dotting with a status message once every three seconds in the preferred embodiment.

Upon loss of sync, the satellite receiver returns to the Voice Guard sync acquisition state. It remains in this state until it re-acquires Voice Guard sync, or until it receives a non-Voice Guard channel assignment.

Upon power-up of voter 100, the digital selector 102 polls each possible digital receiver address (0 to 63)—and digital receivers 104 are initialized beforehand (e.g. using manual DIP switch settings) with appropriate unique addresses. After this message is sent, the selector waits a maximum time period for a response. If the expected response is not received, the selector 102 assumes there is no digital receiver 104 in the system with this address, and goes on to the next address. If a correct response is received, the selector 102 sends an enable message to the responding digital receiver 104. Reception of this message by the digital receiver 104 causes it to illuminate LED 4 on its own front panel. This gives a visual indication that the digital receiver has been power-up enabled, and also that the serial bus is operating properly. While the most efficient system is one in which all digital receivers are addressed consecutively, this is not a requirement for system operation.

After the Voice Guard message is detected at the satellite receiver site, the message is sent to the corresponding digital receiver 104 in the exemplary message format shown below:

| DOTTING | B | MT | GB,IV,SS ... 135 MSEC | FH | VG DATA ... |
|---|---|---|---|---|---|

DOTTING: DOTTING ⟶ CONTINUOUS, AA hex

B: BARKER ⟶ 2 BYTES, 57,12 hex

MT: MESSAGE TYPE BYTE ⟶ 1 BYTE, 11 hex

GB: GUARD BAND ⟶ 8 BYTES, AA hex

IV: INITIALIZATION VECTOR ⟶ 8 BYTES, UNKNOWN

SS: SELECTIVE SIGNALLING ⟶ 2 BYTES, CC hex

FH: FRAME HEADER ⟶ 14 BYTES, BARKER, OA,IV

In order to reduce the throughput delay, the fixed portion of the preamble (which consists of dotting and 60 msec of sync sequence in the preferred embodiment) is not sent past the satellite receiver, but is regenerated at the main site before transmission of the data on the RF port. From the satellite receiver site, the data is sent with the frame headers uncorrected in order for the digital receiver 104 to calculate the bit error rate.

If the site late enters, the message is sent to the digital receiver in the format shown below:

| DOTTING | B | MT | FH | VG DATA ... |
|---|---|---|---|---|

DOTTING: DOTTING ⟶ CONTINUOUS, AA hex

B: BARKER ⟶ 2 BYTES, 57,12 hex

MT: MESSAGE TYPE BYTE ⟶ 1 BYTE, 3D hex

FH: FRAME HEADER ⟶ 14 BYTES, BARKER, OA, IV

The main site begins sending data immediately upon frame header detection; the remainder of the call is treated the same as a preamble entry call.

Figure 6A:
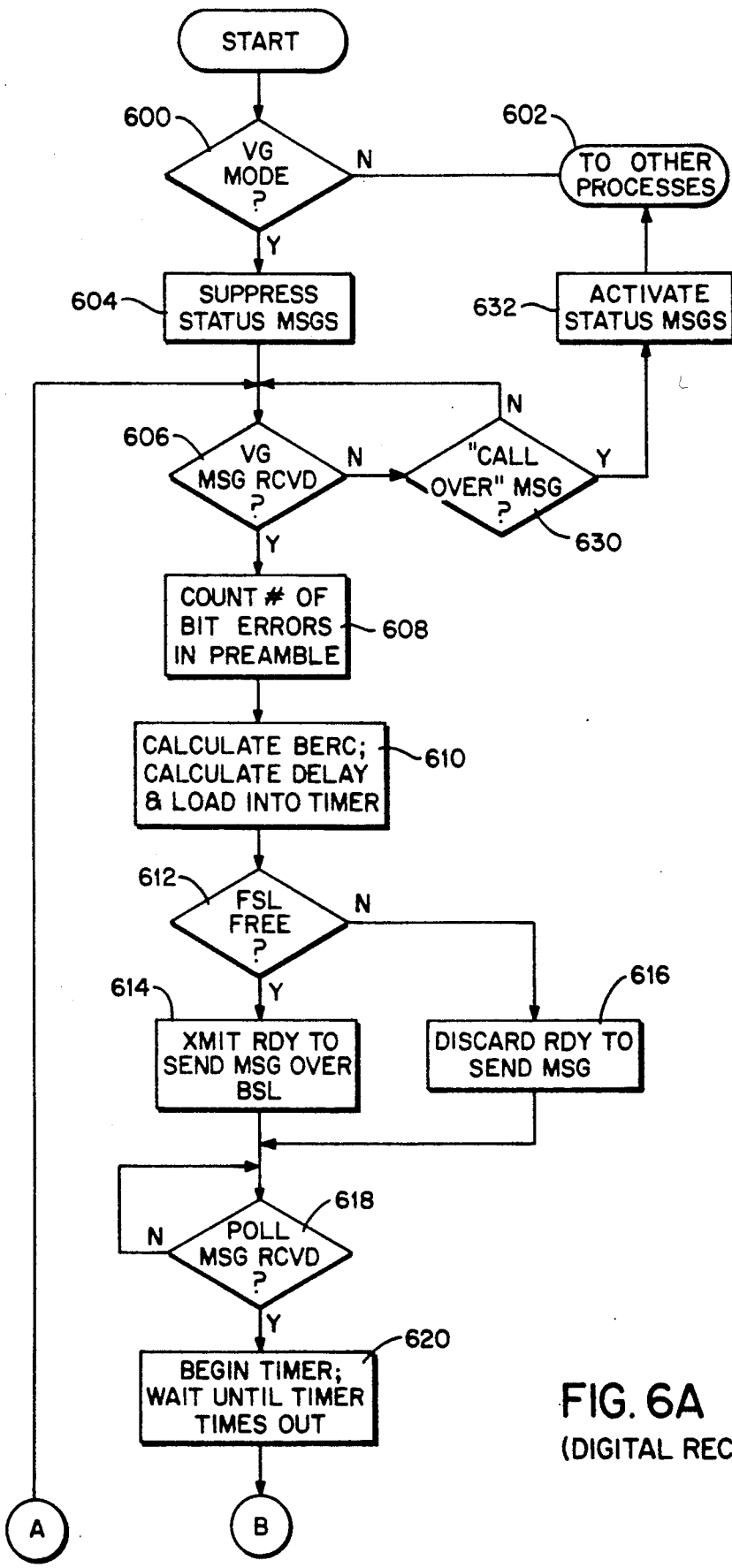

After the Voice Guard call has begun, the digital receivers 104 have detected that the call in progress (FIG. 6A, block 600) and are able to prevent any status messages from being passed on until the call is over (FIG. 6A, block 604). The voting process in the preferred embodiment is based in part on the assumption that messages arriving at the voter 100 at about the same time are redundant; periodic status messages generated by the satellite receiving sites for communication to the main site violate this rule.

Each digital receiver 104 must perform three main functions on the inbound Voice Guard data received from its associated remote receiving site: (a) preamble and late entry detection; (b) bit error counting and error code formulating; and (c) maintaining sync on the Voice Guard data stream.

The inbound Voice Guard message format is shown below:

| GUARD BAND | IV | SS | ...9 REPEATS... |

```
GUARD BAND           ——>   8 BYTES = 64 BITS
INITIALIZATION VECTOR ——>   8 BYTES = 64 BITS
SELECTIVE SIGNALLING ——>   2 BYTES = 16 BITS
                                    144 BITS
```

The message type byte of 11 initiates bit error counting on the Voice Guard preamble guard band (FIG. 6A, blocks 606, 608). The preamble data contains eight bytes of guard band (dotting), eight bytes of initialization vector, and two bytes of selective signalling, all of which is sent a total of nine times, resulting in 12 bytes of data available to vote on. The voting algorithm uses a nibble counter for each of the 144 repeated bits in the preamble in the preferred embodiment for a total of 72 bytes of counters.

Each time a '1' is received for a given bit position in the 144 bit field, that bit position's corresponding nibble counter is incremented; when a '0' is received, the corresponding counter is unaltered. After the entire preamble is received, an error count can be made from the value in the counter. The below table corresponds to an exemplary error counting performed by a digital receiver 104 receiving Voice Guard data in the preferred embodiment:

| COUNTER VALUE | BIT STATE | # BIT ERRORS |
| --- | --- | --- |
| 0 | 0 | 0 |
| 1 | 0 | 1 |
| 2 | 0 | 2 |
| 3 | 0 | 3 |
| 4 | 0 | 4 |
| 5 | 1 | 4 |
| 6 | 1 | 3 |
| 7 | 1 | 2 |
| 8 | 1 | 1 |
| 9 | 1 | 0 |

The number of errors calculated by each counter are summed to obtain a total bit error count (FIG. 6A, block 610). The total is then translated into a bit error rate code (BERC) according to the table below in the preferred embodiment:

| BER CODE | # ERRORS | % ERROR |
| --- | --- | --- |
| 0 | 0–12 | 0.0 |
| 1 | 13–25 | 1.0 |
| 2 | 26–38 | 2.0 |
| 3 | 39–51 | 3.0 |
| 4 | 52–64 | 4.0 |
| 5 | 65–76 | 5.0 |
| 6 | 77–89 | 6.0 |
| 7 | 90–102 | 7.0 |
| 8 | 103–116 | 8.0 |
| 9 | 117+ | 9.0+ |

The divisions/categorizations set forth in the table above are used in the preferred embodiment rather than comparing the number of errors directly to provide some system stability during frame-by-frame voting, and because the signal must change by at least 0.5% before a difference can be detected by the listener. A signal with greater than 10% errors is basically unintelligible. The Voice Guard data stream is voted every frame in the preferred embodiment (approximately four times a second). The digital receiver 104 with the current "best" (lowest) bit error rate code transmits a frame of data to the selector 102 over BSL 106.

When a digital receiver 104 receives a message type byte of 12, it attempts to late enter on the Voice Guard data stream which follows. The digital receiver 104 uses the same late entry requirements as the satellite receiver site in the preferred embodiment. Once late entry is established, the protocol for communicating with the selector is the same as for a preamble entry call, except that the first frame transmitted to the selector will have a message type byte of 12. A late entry data stream is assigned a Bit Error Rate Code of five (# of bit errors=65). It thus takes a late entry receiver 104 with a perfect signal approximately two seconds to upgrade its BERC to zero.

Sync maintenance is performed on the first four bytes of the frame header, which consists of two Barker bytes and two OA bytes. A miss is recorded if nine or more incorrect bytes are detected out of the 36 which are examined. Five consecutive misses constitute a loss of sync as required in the digital receiver 104 sync maintenance algorithm. In the event of a loss of sync by the selected digital receiver 104, the current frame being transmitted is finished, and another digital receiver still in sync transmits the next frame. If no other digital receiver 104 is receiving valid Voice Guard data, the selector 102 will time out and generate the EOM message.

FIG. 4 is a graphical illustration of signal timing at the point in the message flow where the digital receiver 104 has calculated a BERC. The time differential between the receipt of the preamble and completion of calculation of the BERC is to allow for processing time.

When the digital receiver has calculated a BERC, it checks the FSL sync line 108 for activity on the digital receiver -selector BSL link 106 (FIG. 6A, block 612). If the BSL link 106 is free (FSL sync line 108 high) the digital receiver 104 transmits a message to the selector 102 over the BSL (FIG. 6A, block 614). This message serves as a "ready for poll" message to the selector 102 and informs the selector that at least one digital receiver 104 has received a block of Voice Guard data and is ready to transmit that data to the digital selector (FIG. 6B, block 700). An exemplary format for this message is shown below:

| MTB |
| --- |

MTB (message type byte) = OF Hex

Transmission of this ready message uses the same window slot transmit scheme as used in clear voice interactions to avoid collisions on the serial port (see the commonly assigned copending Brown et al application cited above). This scheme calculates a window length before transmit using the address of the digital receiver (all digital receivers in a system have a unique address).

If the FSL 108 is busy, the digital receiver does not send the message but rather suppresses it (FIG. 6A, block 616).

The digital receiver 104 using the BSL 106 to transmit the first BERC releases the FSL sync line 108 immediately after transmitting its message. Upon reception of a BERC READY MTB, the digital selector 102 grabs the FSL sync line 108 (FIG. 6B, block 702). Therefore, when the first-to-transmit digital receiver 104 releases the FSL line 108, the selector 102 already has it activated—thereby preventing any more digital receivers 104 from sending their BERC READY message.

The selector 102 echoes the BERC ready message (FIG. 6B, block 704) so that any other digital receiver 104 waiting to transmit dumps its (duplicate) BERC ready message (FIG. 6A, block 616).

At first report of a BERC, the selector 102 waits a fixed delay time (90 msec in the preferred embodiment) to give all digital receivers 104 a chance to calculate a BERC (FIG. 6B, block 706). Digital selector 102 then sends a poll message to all digital receivers 104 (FIG. 6B, blocks 708, 710). An exemplary poll message format is shown below:

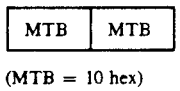

(MTB = 10 hex)

Reception of the first byte of this poll message causes the digital receivers 104 to each set up the priority of the serial interrupt to insure that all digital receivers receive the second byte of the poll message synchronously (FIG. 6A, block 618). That is, the digital receivers 104 each begin operating in a mode in which they are expecting the second byte of the poll message and will immediately respond to appearance of that second byte on BSL 106. The second byte is a repeat of the first byte in the preferred embodiment and is used solely to synchronize the start of a timing process in all digital receivers 104 (FIG. 6A, block 620).

In the preferred embodiment, each digital receiver 104 initializes a timer with a value determined by essentially multiplying two factors: the transmit slot time assigned to each digital receiver; and the calculated BERC (FIG. 6A, block 610). Each digital receiver has a preassigned transmit begin slot S in each of the plural BERC windows W as shown in FIG. 3. The digital receiver 104 with the lowest slot time and the lower BERC loads its timer with the smallest value. The initialized timers of all of the digital receivers 104 begin decrementing upon receipt of the second byte of the poll message.

A digital receiver's transmit delay (i.e., the value used to initiate the timer) after receipt of the poll message is determined by the following formula in the preferred embodiment:

$$VGTXSL = ((BERC+1) \times BERCWD) + VGTINC$$

where VGTXSL: Voice Guard Transmit Slot,
BERC+1: Bit Error Rate Code (normalized to one to prevent a zero slot time), and
BERCWD: Bit Error Rate Code Window.

The Bit Error Rate Code Window value is a constant determined by the slot width times the maximum number of digital receivers in voting system 70 (64 in the preferred embodiment). The slot width in the preferred embodiment is 150 uSEC, which is the smallest it can be and still allow the serial port interrupt on the Intel 8051 microprocessor to be processed in time for the first-come-first-served scheme to work.

Calculating ((BERC+1)×BERCWD) indexes the VGTXSL delay time to the beginning of one of the BERC windows W shown in FIG. 3. Next, the time increment (slot position) into the selected BERC window is calculated as follows:

$$VGTINC = (TXSLOT+1) \times 150 \, uSEC$$

where TXSLOT is the address of the digital receiver and VGTINC stands for "Voice Guard Transmit Increment". Each digital receiver 104 within voter 100 has a unique preassigned address. Therefore, adding VGTINC increments the slot inside the appropriate BERC window calculated above to give the final transmit slot.

A digital receiver 104 which has decremented its timer to zero begins to transmit its received Voice Guard data block over the BSL 106 (FIGS. 6A-6B, blocks 620-628). Digital receivers 104 each monitor FSL 108 during the entire time they decrement the timer, however, and abort message transmission if the FSL is pulled active during that time (indicating that some other digital receiver is beginning to transmit; FIG. 6B, decision block 622) Thus, the digital receiver with the lowest BERC and the lowest transmit slot assignment is the first (and only) to transmit after receipt of the poll message from the selector 102. In this way, digital receiver selection is automatic and requires no poll time or selector decision.

The chosen receiver 104 sends the preamble to the selector 102 in the form shown below:

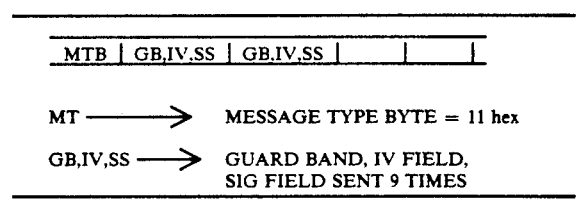

MT ⟶ MESSAGE TYPE BYTE = 11 hex

GB,IV,SS ⟶ GUARD BAND, IV FIELD, SIG FIELD SENT 9 TIMES

An example format for transmission of a frame of Voice Guard data block from a digital receiver 104 to digital selector 102 is shown below:

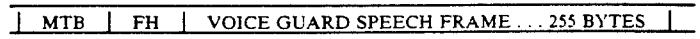

| | | |
|---|---|---|
| MT | →  | MESSAGE TYPE BYTE = 12 hex |
| FH | → | FRAME HEADER = 14 BYTES |

The selector 102 receives the message and passes it on to the main site (FIG. 6C, block 714).

The entire scenario is repeated for each successive frame of data (blocks 606-628). A new bit error rate calculation is made every frame using the four bytes in the sync word and OA fields in the frame header. A new BERC is calculated (FIG. 6A, block 610) using the previous and current number of bit errors. The computation made is shown below in the preferred embodiment:

$$\text{bit errors} = 0.25(current)27 + 0.75(previous).$$

This formula provides some hysteresis in the voting algorithm by taking into account the past bit error information. The multiplication by 27 is to compensate for the difference in the number of bits used to vote on in the preamble and the frame headers. The BERC derived from the number of bit errors calculated above is used during the next frame vote. Thus, frame by frame voting is achieved with no break in message continuity.

The digital receivers 104 buffer one frame of data before transmitting to the selector 102; if the currently chosen receiver loses sync, it has enough good data in its buffer to finish transmitting the current frame. Thus, a receiver 104 which loses sync will not participate in the vote on the next frame, allowing another digital receiver 104 still in sync to transmit.

FIG. 5 is a timing diagram for the Voice Guard voting process in the preferred embodiment. Note that since the digital receiver/selector BSL link 106 is 19.2 Kbaud, there is time for the last-addressed receiver with a BERC of five to begin transmitting in the last transmit slot of the last BERC window W(n) and still transmit the entire frame before it is time to begin the voting process for the next frame.

The Voice Guard call is over when the voter digital selector 102 detects an end of message (EOM), or times out waiting for Voice Guard data from the digital receivers 104 (FIG. 6C, block 712). When one of these events occurs, the selector 102 generates a Voice Guard "call over" message and sends it to the digital receivers 104 over BSL 106 (FIG. 6C, block 716). This message signals the digital receivers 104 to reenable status message transmit (FIG. 6A, blocks 630, 632).

While the discussion above in connection with FIGS. 6A-6C is believed to provide sufficient detail for one of ordinary skill in the art to develop program control instructions for digital receivers 104 and digital selector 102, the state transition diagrams of FIG. 7-11 and the associated description set forth in the attached APPENDIX is provided for the sake of completeness to more completely describe the detailed operation of these components in response to inputs and other events.

A digital voter has been described which efficiently eliminates redundant messages and selects digital messages with the lowest error rates without adding significantly to system latency and while avoiding message contentions within the voter.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

A P P E N D I X

LEVEL 0:

INBOUND_VG_DATA = [ ´57 12 11´ + VG_IV_SEQUENCE + 0{ VG_FRAME }n |
                   ´57 12 12´ + 1{ VG_FRAME }n |
                   1{ VG_FRAME }n ]
* The DIGITAL RECEIVER looks for a barker followed
  by a voice guard frame header. The header ´11´
  signifies a preamble entry, and the header ´12´
  signifies a frame header entry. The DIGITAL
  RECEIVER also enters on the VG_FRAME if by
  chance the barker and header were missed. *

VOTED_VG_IV_SEQUENCE = ´AA 11´ + VG_IV_SEQUENCE

VOTED_VG_FRAME = ´AA 12´ + VG_FRAME

VOTED_VG_DATA = ´57 12 11´ + VG_IV_SEQUENCE + 0{ VG_FRAME }n |
                ´57 12 12´ + 1{ VG_FRAME }n ]
* This data contains the best frames from
  all the SATELLITE_RECEIVERS involved in the
  call. The main site transmits a SYNC_SEQUENCE
  and then repeats this data. *

```
VG_IV_SEQUENCE    = 1{ GUARD_BAND + CRYPTO_IV + CALLER_LID }9 ( + VG_EOM_BURST )

VG_FRAME          = VG_FRAME_HEADER + VG_SBC_SPEECH_DATA ( + VG_EOM_BURST )

VG_FRAME_HEADER   = ´57 12 55 55´ + CRYPTO_IV + CALLER_LID

GUARD_BAND        = * 64 bit pattern interleaved for fade protection.
                      (101010...) *

CRYPTO_IV         = * 64 bit VG cryptographic IV. *

CALLER_LID        = * 16 bits used for calling units logical id. *

VG_SBC_SPEECH_DATA = * 2040 bits of subband coded speech data. *

VG_EOM_BURST      = 16{ VG_EOM_PACKET }16
                    * The VG_EOM_BURST can occur anywhere in the VG
                      transmission. The DIGITAL RECEIVER is constantly
                      in search of the end of message burst. *

VG_EOM_PACKET     = ´A8 ED AA AA´

BERC_READY_MSG    = ´AA OF F0´
                    * Message sent to the SELECTOR when the DIGITAL
                      RECEIVER has VG data ready to send to the
                      SELECTOR. The SELECTOR echos this message back
                      on the BSL so that all DIGITAL RECEIVERS not
                      involved in the VG call will know that a VG
                      call is in progress. No STATUS_MSGs are
                      transmitted on the BSL during a VG call. *

VG_POLL_MSG       = [ ´AA 10 10´ | ´AA 10 11´ ]
                    * Message sent to the DIGITAL RECEIVER from the
                      SELECTOR to tell the DR to start it´s VG transmit
                      timer. *

LEVEL 1:
─────── data:
BSLITX_STCMD      = * BSL TX interrupt service routine state vector. *

BSLTXBUF          = * BSL TX interrupt service routine transmit buffer. *

BSLTX_INDEX       = * BSL TX interrupt service routine extraction pointer
                      for DIGPLBUF. *

DIGPLBUF          = * DIGITAL phone line receive buffer. (256 bytes) *

PLIRX_STCMD       = * PL RX interrupt service routine state vector. *

SAVELOC           = * The BSL TX interrupt service routine will only
                      transmit up to this location after a VG_EOM_BURST
                      is detected (the flag LASTFRAME will be set). *

SYNCLOC           = * Background extraction pointer for DIGPLBUF. * control: (designated by dotted lines)
LASTFRAME         = * Set by the background receive routine when a
                      VG_EOM_BURST is detected. When setting this flag
                      SAVELOC must be set up to equal the value of the
                      current background extraction pointer. *
```

| | |
|---|---|
| PLRXON | = * Flag set by the phone line interrupt service routine when in VG mode and a byte is received. * |
| RXEDPREAMBLE | = * Flag set by the phone line interrupt service routine when a preamble VG header is received. * |
| RXEDVGDATA | = * Flag set by the phone line interrupt service routine when VG data is received. * |

LEVEL 2:

data:

| | |
|---|---|
| BSLDG_EXTPTR | = * Extraction pointer for the VG data in the buffer DIGBSLBUF. Used in the PL TX interrupt service routine. * |
| BSLIRX_STCMD | = * State vector for BSL RX interrupt service routine. * |
| BSLITX_STCMD | = * State vector for BSL TX interrupt service routine. * |
| BSLRX_STCMD | = * State vector for background BSL RX routine. * |
| BSLRX_INDEX | = * Fill pointer into the buffer DIGBSLBUF. Used in the BSL RX interrupt service routine. * |
| BSLTXBUF | = * BSL TX interrupt service routine transmit buffer. * |
| DIGBSLBUF | = * Digital BSL receive buffer. (256 bytes) * |
| PLITX_STCMD | = * State vector for PL TX interrupt service routine.* |
| PLIRX_STCMD | = * State vector for PL RX interrupt service routine. * |
| SRXBYTE | = * Byte received on the BSL when in a VG call. The SELECTOR background BSL RX routine looks at this byte when looking for an EOM packet. * |
| VGMSG_TIMER | = * Timer used by selector to determine a loss of sync. When the DRs loose sync on the inbound data, they stop transmitting. The DR detects this by having this timer time out when it hasn't seen data from the DR in 400 msecs. * | control:

| | |
|---|---|
| VGRXBYTE | = * Flag set by the BSL RX interrupt service routine when in VG mode and a byte is received. The Selector uses this flag to know when to look at SRXBYTE. * |

LEVEL 1.1. PHONE LINE INTERRUPT SERVICE ROUTINE (DIGITAL RECEIVER MODE):
---

The phone line interrupt is always in barker search mode when it is not receiving a message or voiceguard data. Thus an interrupt will not occur until a '57 12' is detected by the modem chip.

A start byte, AAH, is looked for in state 0, and a valid header is looked for in state 1. If a voiceguard header is received, then the receipt of VG data is flagged for the background, and initialization is performed to receive the rest of the data. LED #2 is illuminated to indicate that the DR is receiving VG data from it's satellite receiver. The flag VGABORT is used by the background to abort any possible STATUS or ALARM transmit. Only messages not yet started on the BSL are aborted.

PLIRX_STCMD = 1:
    If [ '57 12 12' | '57 12 55 55' | '57 12 11' ] received then do If '57 12 11' received then
        Set RXEDPREAMBLE

```
            Turn on LED #2
            PLRX_INDEX = 0
            SYNCLOC = 0
            BSLTX_INDEX = 0
            PLIRX_STCMD = 0
            Set RXEDVGDATA
            Clear RXEDFRAME
            Clear DFDONE
            Clear LASTFRAME
            Clear LOSTSYNC
            Clear LASTMSGBUF(0)
            Set VGABORT
        end
```

When the phone line interrupt is in state 3, then all it does is put received bytes into the 256 byte receive buffer, DIGPLBUF. The only way out of this state is for the background to reset the state vector.

```
PLIRX_STCMD = 3:
        DIGPLBUF(PLRX_INDEX) = SBUF
        Increment PLRX_INDEX
        Set PLRXON
```

LEVEL 1.2.1. TRACK VG DATA:
--------------------------

When the PL receive routine is in state 0, it is waiting for the PL receive interrupt to flag received data. Once the received VG data flag is set, this state performs the initialization to start tracking the data.

```
PLRX_STCMD = 0:
        If RXEDVGDATA then do
            If RXEDPREAMBLE then do
                Clear BTCNTT (bit counter table)
                PLRX_STCMD = 1
                TXFRAMES = 0
                Disable STATUS and ALARM transmit timers
                Clear PLRXON
            end
            Else do
                PLRX_STCMD = 2
                TXFRAMES = 0
                OLDVGBITERR = 58
                BERCOD = 6
                VGTXSL = ((BERCOD + 1) x BERCWD) + VGTINC
                Disable STATUS and ALARM transmit timers
                Clear PLRXON
            end
        end
```

The PL receive routine is in state 1 when it is receiving the IV_SEQUENCE. The DR keeps a table of bit counters to vote the 9 repeats of the sequence. After all 9 repeats are received, the totals are calculated and the the bit error code is derived from this total. The bit error code determines the transmit slot time. An EOM is allowed in the IV_SEQUENCE, so the code is also looking for an EOM packet.

```
PLRX_STCMD = 1:
        If PLRXON then do
            RIGHBT = DIGPLBUF(SYNCLOC)
            Increment SYNCLOC
            Update BTCNTT
            Increment RPTCNT
            If RPTCNT = #PIDBYTE + 1 then do
                RPTCNT = 0
                Increment TXFRAMES
                If TXFRAMES = 9 then do
```

```
            OLDVGBITERR = total # of bit errors in VG_IV_SEQUENCE
            BERCOD = BERTBL(OLDVGBITERR)
            VGTXSL = ((BERCOD + 1) x BERCWD) + VGTINC
            Set TXVGBSLMSG
            Set RXEDFRAME
            PLRX_STCMD = 2
            TXFRAMES = 0
            Goto PLRX2
        end
    end Look for VG EOM BURST
    If DFDONE then do
        Clear DFDONE
        SAVELOC = SYNCLOC
        Set LASTFRAME
        Set TXVGBLSMSG
        Set RXEDFRAME
        Clear RXEDVGDATA
        Clear RXEDPREAMBLE
        PLRX_STCMD = 0
        PLIRX_STCMD = 0
        Resync phone modem
        Turn off LED #2
    end
end
```

In state 2, VG frames are being received. The DR must look for an EOM packet and look for a loss of sync. If either is detected, the call is terminated. When an EOM is detected, the call is not terminated til the entire frame is received in. This is done this way so that all the DRs receives will be somewhat in sync.

```
RX_STCMD = 2:
    If PLRXON then do
        HIGHBT = DIGPLBUF(SYNCLOC)
        If not DFDONE then do
            Look for VG EOM BURST
            If DFDONE then
                SAVELOC = SYNCLOC
        end
        Look for loss of sync
        If LOSTSYNC then do
            Clear RXEDVGDATA
            Clear RXEDPREAMBLE
            PLRX_STCMD = 0
            PLIRX_STCMD = 0
            Resync phone modem
            Turn off LED #2
        end
        If last byte of VG frame then do
            If DFDONE then do
                Clear DFDONE
                SAVELOC = SYNCLOC
                Set LASTFRAME
                Set TXVGBLSMSG
                Set RXEDFRAME
                Clear RXEDVGDATA
                Clear RXEDPREAMBLE
                PLRX_STCMD = 0
                PLIRX_STCMD = 0
                Resync phone modem
                Turn off LED #2
            end
        Clear PLRXON
    end
```

LEVEL 1.2.2. TRANSMIT BERC READY MSG:
------------------------------------

If the flag TXVGBSLMSG is set, then a voiceguard frame has been received from the satellite receiver, and the DR needs to send a BERC READY message to the SELECTOR.

```
BSLTX_STCMD = 0:
    If TXVGBSLMSG then do
        If not BSLTXING then do
            Set BSLTXING
            BSLTX_STCMD = 1
            TXMSGBF = #BERCBUF
        end
    end
```

In state 1, the DR is looking for a duplicate message until the SYNCLINE is free. If a duplicate message is seen in LASTMSGBUF, then the transmit is aborted. LASTMSGBUF is filled in the BSL receive interrupt routine. If the SYNCLINE is inactive, then the transmit is initiated by enabling the transmit slot timer and the COLLISION interrupt.

```
BSLTX_STCMD = 1:
    If LASTMSGBUF = BERCBUF then do
        BSLTX_STCMD = 0
        Clear BSLTXING
        Clear TXVGBSLMSG
    end
    Else do
        If not SYNCLINE then do
            Grab SYNCLINE
            Clear TXVGBSLMSG
            Set BERCTXING
            MODOINT_STCMD = 1
            TIMER 2 = IRCP2
            Set TR2
            Set EX0
            BSLTXBUF = BERCBUF
            BSLTX_STCMD = 0
        end
```

LEVEL 1.2.3.  TIMER 2 INTERRUPT SERVICE ROUTINE (DIGITAL RECEIVER MODE):
---

The TIMER 2 interrupt service routine initiates a DIGITAL RECEIVER (DR) transmit on the backup serial line (BSL). Each DIGITAL RECEIVER has a unique time slot that it may transmit in. When the DR needs to transmit a message, it loads TIMER 2 with it's time slot and enables the collision interrupt. If TIMER 2 times out, a start byte (#AAH) is transmitted, and the message transmit is initiated. If the COLLISION interrupt occurs first, then the transmit is aborted. TIMER 2 and the COLLISION interrupt service routines disables both interrupts. The background will re-enable both interrupts and grab the SYNCLINE when it has a message to send.

If wanting to transmit a BERC READY message, (or any other inbound message), the TIMER 2 interrupt is in state 0. In this state, LED #3 is turned on to indicate that this DR is transmitting on the BSL, the BSL TX interrupt routine state vector is put in a state where it will transmit the message in BSLTXBUF, and the flag BERCTXING is cleared. BERCTXING is only set while trying to transmit a BERC READY message. It is used by this interrupt service routine and the COLLISON interrupt service routine.

```
T2INT_STCMD = 0:
    Turn on LED #3
    BSLITX_STCMD = 1
    Clear BERCTXING
    MDOINT_STCMD = 0
    SBUF = #STARTBYTE
    Clear TR2
    Clear EX0
```

If wanting to transmit a voiceguard frame, then TIMER 2 interrupt is in state 3. In this state LED #3 is turned on to indicate that the DR is transmitting on the BSL, and the BSL TX interrupt state vector is put in a state where it will transmit a data frame.

```
T2INT_STCMD = 3:
    Turn on LED #3
    BSLITX_STCMD = 7
    T2INT_STCMD = 0
    MDOINT_STMCD = 0
    SBUF = #STARTBYTE
    Clear TR2
    Clear EX0
```

LEVEL 1.2.4.  COLLISION INTERRUPT SERVICE ROUTINE:
------------------------------------------------

The COLLISION interrupt service routines handles collisons on the
backup serial line (BSL).  If this interrupt occurs, then the DR was
trying to transmit a message. The slot timer, TIMER 2, and the COLLISION
interrupt must be disabled, and the SYNCLINE released.

State 1 is the voiceguard state for the COLLISON interrupt. The
flag BERCTXING tells whether a BERC READY message or a VG frame is
up for transmit.  When this interrupt occurs, the current transmit
must be dumped.  If dumping a VG frame, then the extraction pointer
used by the BSL TX interrupt routine must be incremented.  The flag
RXEDPREAMBLE tells whether an IV_SEQUENCE or a VG_DATA_FRAME is to
be dumped.

```
MDOINT_STCMD = 1:
    Clear BSLTXING
    Release SYNCLINE
    MDOINT_STCMD = 0
    Clear TR2
    Clear EX0

If BERCTXING then
        Clear BERCTXING
    end

Else do
        T2INT_STCMD = 0
        If RXEDPREAMBLE then do
            Clear RXEDPREAMBLE
            BSLTX_INDEX = BSLTX_INDEX + #IVIDSZ
        end
        Else
            BSLTX_INDEX = BSLTX_INDEX + #DFRSZ
    end
```

LEVEL 1.3.1.  BSL RX INTERRUPT SERVICE ROUTINE (DIGITAL RECEIVER MODE):
----------------------------------------------------------------------

When receiving messages on the BSL, a start byte, AAH, must be
seen before looking for a valid header.  The header determines the type
and length of the message.  In state 2, the BSL RX interrupt receives
a BSL message.  All messages received are put in the BSLRXBUF queue,
where they are decoded by the background.  After the message has been
completely received, then the message is also written to the buffer
LASTMSGBUF.  This buffer is used by the background BSL transmit routine
to check for a duplicate message.

After receiving a BERC READY message, the background must be told
to abort any possible STATUS or ALARM transmit.  The BERC READY message
is echoed from the SELECTOR to let any DR not receiving VG data from it's
satellite receiver know that a VG call is in progress.  After receiving
this echoed message, any DR who has not previously done so, must disable
it's STATUS and ALARM transmit timers.  These timers are not re-enabled
until a VG EOM message is received from the SELECTOR, telling the DRs
that the VG call is over.  The flag RXEDEOM is set so that no other
background processing is done before the VG EOM message is processed.

If a VG POLL header is received, then the priority of the BSL interrupt must be raised. This is done to force the DRs to receive the next byte of the poll message at the same time. Thus they will all start there slot timers at the same time, forcing a collision. The DR with the lowest bit error code and the lowest slot time will get it's frame through.

```
BSLIRX_STCMD = 2:
      If BERC READY message recevied then do
         Set VGABORT
         Put message in BSLRXBUF queue
         LASTMSGBUF = BERC READY message
      end If VG EOM message received then do
         Set RXEDEOM
         Put message in BSLRXBUF queue
         LASTMSGBUF = VG EOM message
      end If VG POLL header received then do
         Set PS (raise the priority of the serial interrupt)
         BSLIRX_STCMD = 6
      end
```

When the BSL RX interrupt is in state 6, it is waiting for the 2nd byte of the VG POLL message. When this second byte is received, the transmit of the VG frame is initiated by loading the slot time, based on the bit error code and slot number, into TIMER 2, enabling TIMER 2 and the COLLISION interrupts, and grabbing the SYNCLINE. This is only done if a VG frame has been received from the satellite receiver.

```
BSLIRX_STCMD = 6:

If RXEDFRAME then do
         Clear RXEDFRAME
         TIMER 2 = VGTXSL
         T2INT_STCMD = 3
         MDOINT_STCMD = 1
         Set TR2
         Set EX0
         Grab the SYNCLINE
         Set BSLTXING
      end clear LASTMSGBUF
      clear PS
      BSLIRX_STCMD = 0
```

LEVEL 1.3.2.  BSL TX INTERRUPT SERVICE ROUTINE (DIGITAL RECEIVER MODE):
-----------------------------------------------------------------------

The BSL TX interrupt service routine either transmits a message out of BSLTXBUF or transmits VG data out of DIGPLBUF.

In state 1, the BSL TX interrupt performs initialization to transmit the message. The length of the message is in the first byte of BSLTXBUF. State 2 transmits the message and calculates an exclusive or checksum. The checksum is inverted before it is transmitted. After the transmit is complete, LED #3 is turned off and the SYNCLINE is released.

```
BSLITX_STCMD = 1:
      BSLITX_STCMD = 2
      BSLINDEXTX = 1
      BSLTXLEN = BSLTXBUF(0)
      BSLTXCHKSUM = 0
```

```
BSLITX_STCMD = 2:
        If BSLTXLEN = 0 then do
            BSLITX_STCMD = 0
            Clear BSLTXING
            Release SYNCLINE
            Turn off LED #3
        end Else if BSLTXLEN = 1 then do
            Increment BSLINDEXTX
            Decrement BSLTXLEN
            SBUF = /BSLTXCHKSUM
        end Else do
            BSLTXCHKSUM = BSLTXCHKSUM xor BSLTXBUF(BSLINDEXTX)
            Increment BSLINDEXTX
            Decrement BSLTXLEN
            SBUF = BSLTXBUF(BSLINDEXTX)
        end
``` frames. When the flag LASTFRAME is set, then the interrupt routine knows that it is transmitting the last VG frame. The DR only transmits up to the second EOM packet and then stops transmitting. This location is saved in SAVELOC.

```
BSLITX_STCMD = 7:
        If RXEDPREAMBLE then do
            Clear RXEDPREAMBLE
            BSLITX_STCMD = 8
            BSLTXLEN = #IVIDSZ
            SBUF = #VGPREHDR
        end
        Else do
            BSLITX_STCMD = 9
            BSLTXLEN = #FRHDRSZ
            SBUF = #VGDFRHDR
        end BSLITX_STCMD = 8:
BSLTX8: If LASTFRAME then do
            BSLITX_STCMD = 10
            Goto BSLTXA
        end
        Else do
            If BSLTXLEN = 0 then do
                BSLITX_STCMD = 0
                Release SYNCLINE
                Clear BSLTXING
            end
            Else do
                Increment BSLTXLEN
                Decrement BSLTXLEN
                SBUF = DIGPLBUF(BSLTX_INDEX)
            end
        end BSLITX_STCMD = 9:
        If LASTFRAME then do
            BSLITX_STCMD = 10
            Goto BSLTXA
        end
        Else do
            If BSLTXLEN = 0 then do
                BSLTXLEN = #SBCSZ
                BSLITX_STCMD = 8
                Goto BSLTX8
            end
            Else do
                Increment BSLTX_INDEX
                Decrement BSLTXLEN
                SBUF = DIGPLBUF(BSLTX_INDEX)
            end
        end
```

```
BSLITX_STCMD = 10:
BSLTXA: If BSLTX_INDEX = SAVELOC then do
            BSLITX_STCMD = 0
            Release SYNCLINE
            Clear BSLTXING
        end
        Else do
            Increment BSLTX_INDEX
            SBUF = DIGPLBUF(BSLTX_INDEX)
        end
```

LEVEL 2.1.1. BSL RX INTERRUPT SERVICE ROUTINE (SELECTOR MODE):
----------------------------------------------------------------

When receiving messages on the BSL, a start byte, "AAH", must be seen before looking for a valid header. The header determines the type and length of the message. In state 2, the BSL RX interrupt receives a BSL message. All messages received are put in the BSLRXBUF queue, where they are decoded by the background. Every message received by the SELECTOR is echoed back to the DRs.

After receiving a BERC READY message, the SELECTOR prepares to send a VG POLL message to the DRs. This set up is done in the background. In the interrupt routine, the VG message timer is initialized and the STATUS and ALARM transmit timers are disabled. The VG message timer is a 400 msec timer. Every time a BERC READY message is received, the timer is reset. If the timer expires, then the SELECTOR generates a VG EOM message to send to the DRs, and terminates the VG transmit to the main site.

```
BSLIRX_STCMD = 2:
        If BERC READY message received then do
            VGMSG_TIMER = 400msec
            Disable STATUS and ALARM transmit timers
        end
```

If a voiceguard header byte is received, then the SELECTOR needs to make sure that is has initiated the transmit to the main site. A "11" header signifies the IV_SEQUENCE, and a "12" header signifies a VG FRAME. When initializing the fill pointer for DIGBSLBUF, the SELECTOR leaves enough room to write a "57 12" and the header byte to the buffer.

```
        If "AA 11" received then do
            BSRXLEN = 162
            BSLIRX_STCMD = 7
            BSLRX_INDEX = 3
            BSLDG_EXTPTR = 0
            BSLRX_STCMD = 2
            DIGBSLBUF(2) = "11"
            Set FIRSTFRAME
        end If "AA 12" received then do
            BSRXLEN = 14
            BSLIRX_STCMD = 8

If FIRSTFRAME then
                BSLRX_STCMD = 3

Else do
                BSLRX_INDEX = 3
                BSLDG_EXTPTR = 0
                DIGBSLBUF(0) = "57"
                DIGBSLBUF(1) = "12"
                DIGBSLBUF(2) = "12"
                PLITX_STCMD = 7
                BSLRX_STCMD = 3
                EOMCASE = 0
                Set FIRSTFRAME
            end
```

States 7 and 8 are for receiving VG data in from the BSL. All bytes are deposited into the buffer DIGBSLBUF. The receive pointer is BSLRX_INDEX.

```
BSLIRX_STCMD = 7:
      SRXBYTE = SBUF
      DIGBSLBUF(BSLRX_INDEX) = SRXBYTE
      Set VGRXBYTE
      Increment BSLRX_INDEX
      Decrement BSRXLEN
      If BSRXLEN = 0 then
           BSLIRX_STCMD = 0

BSLIRX_STCMD = 8:
      SRXBYTE = SBUF
      DIGBSLBUF(BSLRX_INDEX) = SRXBYTE
      Set VGRXBYTE
      Increment BSLRX_INDEX
      Decrement BSRXLEN
      If BSLRXLEN = 0 then do
           BSLIRX_STCMD = 7
           BSRXLEN = 255
      end
```

LEVEL 2.1.2. BSL TX INTERRUPT SERVICE ROUTINE (SELECTOR MODE):
---

All message received on the BSL by the SELECTOR are echoed back to all DRs. State 0 takes care of initiating the echo. States 1 and 2 are the same as that defined for the DIGITAL RECEIVER. The only diffence is that when the SELECTOR echoes a message, it keeps the SYNCLINE held for one additional byte after the checksum to give the DRs time to check for a duplicate message.

States 3 and 4 are exactly like states 1 and 2 except that no checksum is transmitted. These states are used to transmit the VG POLL message.

LEVEL 2.2.1. SET UP TO TX VG POLL MESSAGE:
---

This process simply loads TIMER 2 with a 10 msec delay. When TIMER 2 times out, the VG POLL message will be sent to the DRs. This delay is needed to give all DRs time to finish receiving their data frame.

With a 10 msec delay and about 5 msec in the polling process, about 15 msecs of difference is allowed between the DRs receives.

```
      T2INT_STCMD = 1
      TIMER 2 = 10 msec
      Set TR2
      Disable STATUS and ALARM transmit timers
```

LEVEL 2.2.2. TIMER 2 INTERRUPT SERVICE ROUTINE (SELECTOR MODE):
---

The TIMER 2 interrupt service routine, in state 1, begins the transmit of a VG POLL message to the DRs by putting the background BSL TX routine in the appropriate state.

```
T2INT_STCMD = 1:
      BSLTX_STCMD = 2
      T2INT_STCMD = 0
```

LEVEL 2.2.3. TRANSMIT VG POLL MESSAGE:

If the SELECTOR is not currently transmitting, then this state grabs the SYNCLINE and starts the transmit of a VG POLL message.

```
If not BSLTXING then do
   If not SYNCLINE then do
      Set BSLTXING
      Grab SYNCLINE
      BSLTXBUF = VG POLL message
      BSLITX_STCMD = 3
      BSLTX_STCMD = 0
      SBUF = #STARTBYTE
   end
end
```

LEVEL 2.2.4. LOOK FOR VG EOM BURST:

This process looks for a VG EOM packet. Once the SELECTOR sees the EOM, then it will terminate the call by sending a VG EOM message on the BSL, and finishing up the transmit to the main site. The SELECTOR sends 4 EOM packets to the main site at the end of the VG transmission.

```
If VGRXBYTE then do
   Clear VGRXBYTE
   EOMCASE = 0:  If SRXBYTE = #EOMB1 then
                    EOMCASE = 1
   EOMCASE = 1:  If SRXBYTE = #EOMB2 then
                    EOMCASE = 2
                 Else EOMCASE = 0
   EOMCASE = 2:  If SRXBYTE = #EOMB3 then
                    EOMCASE = 3
                 Else EOMCASE = 0
   EOMCASE = 3:  IF SRXBYTE = #EOMB4 then do
                    PLITX_STCMD = 5
                    Grab SYNCLINE
                    BSLTX_STCMD = 3
                    BSLRX_STCMD = 0
                    Clear FIRSTFRAME
                    VGMSG_TIMER = #DISABLE
                 end
                 Else EOMCASE = 0
```

LEVEL 2.2.5. TRANSMIT VG EOM:

This process initiates the transmit of the VG EOM message to the DRs. If not already transmitting on the BSL, then put the VG EOM message in the transmit buffer BSLTXBUF and set up the state vector for the BSL TX interrupt routine.

```
If not BSLTXING then do
   Set BSLTXING
   BSLTXBUF = VG EOM message
   BSLITX_STCMD = 3
   BSLTX_STCMD = 0
   SBUF = #STARTBYTE
end
```

LEVEL 2.2.6. TIMER 0 INTERRUPT SERVICE ROUTINE:

The SELECTOR enables a VG timer to time data coming from the DRs. Every time a BERC READY message is received, VGMSG_TIMER is reset. If this timer is allowed to time out, then the SELECTOR has not received any data from the DRs in 400 msecs. This would happen if all DRs lost sync on the inbound data. When the timer times out, then the SELECTOR terminates the VG call.

```
If VGMSG_TIMER not = #DISABLE then do
   If VGMSG_TIMER = #TIMEOUT then do
      If not SYNCLINE then do
         PLITX_STCMD = 0
         Turn off LED #3
         PLIRX_STCMD = 0
         Resync modem
         Re-enable STATUS and ALARM transmit timers
         BSLTX_STCMD = 3
         BSLRX_STCMD = 0
         BSLIRX_STCMD = 0
         Clear FIRSTFRAME
      end
   Else decrement VGMSG_TIMER
end
```

LEVEL 2.3.1. PHONE LINE RX INTERRUPT SERVICE ROUTINE (SELECTOR MODE):

The SELECTOR does nothing with the VG data received from the main site. If in SELECTOR mode, the selector goes to state 3, just like the DIGITAL RECEIVER does. The background must reset the state once the VG call is over.

LEVEL 2.3.2. PHONE LINE TX INTERRUPT SERVICE ROUTINE (SELECTOR MODE):

States 4 and 5 are for transmitting the VG data to the main site. The PL TX interrupt is in state 5 when it is finishing up the transmit after an EOM has been detected or the SELECTOR has timed out waiting for VG data from the DRs. State 6 transmits 4 packets of a VG_EOM_BURST.

```
PLITX_STCMD = 4:
PLTX4:
      MDTXD1 = DIGBSLBUF(BSLDG_EXTPTR)
      Increment BSLDG_EXTPTR PLITX_STCMD = 5:
      MDTXD1 = DIGBSLBUF(BSLDG_EXTPTR)
      Increment BSLDG_EXTPTR
      If BSLDG_EXTPTR = BSLRX_INDEX then do
         PLITX_STCMD = 6
         EOMCTR = 4
         TXEOMCASE = 0
      end PLITX_STCMD = 6:
      TXEOMCASE = 0:  MDTXD1 = #EOMB1
      TXEOMCASE = 1:  MDTXD1 = #EOMB2
      TXEOMCASE = 2:  MDTXD1 = #EOMB3
      TXEOMCASE = 3:  MDTXD1 = #EOMB4
                      TXEOMCASE = 0
                      Decrement EOMCTR
                      If EOMCTR = 0 then do
                         PLITX_STCMD = 0
                         Turn off LED #3
                         PLIRX_STCMD = 0
                         Resync modem
                         Reset STATUS and ALARM transmit timers.
                      end
```

When the PL TX interrupt is in state 7, then it is waiting to begin the VG transmit to the main site. After 160 msec of data, 192 bytes, are received on the BSL, the transmit is initiated. This delay is needed to give the SELECTOR time to buffer enough data so that it will not run out of data if by chance the first
data frame has the highest bit error code. The data to the main
site must be continuous.

```
PLITX_STCMD = 7:
    If BSLRX_INDEX = 192 then do
        PLITX_STCMD = 4
        Turn on LED #3
        Goto PLTX4
    end Else
        MDTXD1 = #DOTBYTE
```

What is claimed is:

1. In an RF trunking system of the type including plural spatially disparate receiving sites S1-SN each including digital RF receiving means for receiving digitally encoded RF signals transmitted by mobile/portable RF transceivers and further including means for decoding said received signals to provide corresponding digital messages to a digital voter apparatus, said digital voter apparatus comprising:

plural digital receiving means, each operatively connected to a corresponding one of said means for decoding, each of said digital receiving means for receiving said digital messages provided by the receiving site corresponding thereto;

bit error rate calculating means coupled to said plural digital receiving means for calculating, in parallel, plural bit error rate values associated with each of said received messages; and scheduling means, coupled to each of said plural digital receiving means and also coupled to said bit error rate calculating means, for controlling said plural digital receiving means to select and output a message having the lowest calculated bit error rate value associated therewith and for controlling said plural digital receiving means to discard all other received messages, said scheduling means including:

a bus, and means coupled to said bus for scheduling application of said messages onto said bus at times responsive to said calculated bit error rates and for aborting scheduled application of messages to said bus in response to detection of signals on said bus.

2. An RF trunking system of the type including first and second geographically located receiving sites S1 and S2 each including digital RF receiving means for receiving digitally encoded RF signals transmitted by mobile/portable RF transceivers and further including means for decoding said received signals to select corresponding digital messages said system further comprising:

first digital RF receiving means operatively connected to said means for decoding included in said first receiving site S1 for receiving and temporarily storing a first digital message provided by said first receiving site S1;

second digital RF receiving means operatively connected to said means for decoding included in said second receiving site S2 for receiving and temporarily storing a second digital message provided by said second receiving site S2;

digital selector means for selecting only one of said stored first and second digital messages and for synchronizing said first and second digital RF receiving means to a time $T_0$; and a bus for connecting said first and second digital RF receiving means and said digital selector means;

said first digital receiving means including first transmitting means for calculating a first time delay Delta $T_0$ associated with the reliability of said first digital message, and for transmitting said first digital message over said bus to said digital selector means beginning at a time $T_0 +$ Delta $T_1$; and said second digital receiving means including:

second transmitting means for calculating a time delay Delta $T_0$ corresponding to the reliability of said second message and for transmitting said second message over said bus to said selector means beginning at time $T_0 +$ Delta $T_2$, detecting means connected to said bus means for detecting the occurrence of first and/or second messages on said bus, and means connected to said detecting means and to said second transmitting means for selectively inhibiting said second transmitting means from transmitting in response to detection of messages on said bus by said detecting means between time $T_0$ and time $T_0 +$ Delta $T_1$.

3. A system as in claim 2 wherein said first transmitting means includes means for transmitting said first message over a time period longer than time period Delta $T_2 -$ Delta $T_1$.

4. In an RF trunking system of the type including a receiving site S1 including digital RF receiving means for receiving digitally encoded RF signals transmitted by mobile/portable RF transceivers and means for decoding said received signals to generate corresponding digital messages, a method comprising:

(a) preassigning a slot number associated with said receiving site S1;

(b) receiving and temporarily storing a digital message provided by a first decoding means;

(c) calculating a bit error rate value corresponding to said stored digital message;

(d) determining a window delay time in response to said calculated bit error rate value;

(e) timing said window delay time beginning at a times $T_0$;

(f) timing a further transmission slot delay time in response to said preassigned slot number;

(g) concurrently with said timing steps (e) and (f), monitoring a digital signal bus for the occurrence of a signal;

(h) transmitting said first digital message over said digital signal bus beginning upon elapse of said window and slot delay time if no signals are detected by said monitoring step (g) prior to the time said window and slot delay times elapse; and (i) discarding said first digital message if said monitoring step (g) detects the occurrence of a signal on said digital signal bus between time $T^0$ and elapse of said window and slot delay times.

5. A method as in claim 4 wherein said transmitting step (h) includes transmitting said first message over a duration longer than said window delay time.

6. In an RF trunking system of the type including at least a first receiving site including digital RF receiving means for receiving digitally encoded RF signals transmitted by mobile/portable RF transceivers and means for decoding said received signals to generate corresponding digital messages, a method comprising:
 (a) receiving a digital message provided by said means for decoding included in said first receiving site;
 (b) calculating a bit error rate in response to said received digital message;
 (c) timing a delay the duration of which is responsive to said calculated bit error rate;
 (d) testing whether a service request line is inactive;
 (e) if said testing step (d) reveals said service request line is active, discarding said digital message received by said receiving step (a) and inhibiting a transmitting step (f); and
 (f) if said testing step (d) reveals said service request line is inactive, transmitting said first digital message over a signal bus beginning at a time determined at least in part in response to said timed delay.

7. A digitally trunked RF communications system comprising:
 a first RF communications site including RF transceiving means for transmitting RF signals to and receiving digitally encoded RF signals from mobile/portable RF transceivers, said first RF communications site further including control channel transceiving means for transmitting synchronization and control signals over an RF communications channel and for receiving control signals over said RF communications channel;
 at least one further RF communications site geographically distant to said first site, said further site including RF receiving means for receiving digitally encoded RF signals from said mobile/portable RF transceivers, said further site further including a control channel monitoring means connected to said RF receiving means for monitoring said synchronization signals transmitted by said first site on said outbound control channel frequency and for synchronizing said RF receiving means with said received synchronization signals;
 first communications link means connecting said further site RF receiving means to a voting location for communicating received digital signals from said satellite RF receiving means to a voter means at said voting location;
 second communications link means connecting said first site RF transceiving means to said voting location for communicating received digital signals from said first site RF transceiving means to said voter means;
 said voting means disposed at said voting location and connected to said first and second communications means for determining which of said signals communicated thereto are redundant, for selecting the version of said redundant signals having the lowest error rate, and for communicating said selected signal version to said first site RF transceiving means, said voting means including a bus, and delaying means for delaying application of signals to said bus in response to the magnitude of said error rate.

8. In an RF trunking system of the type including plural spatially separated receiving sites S1-SN each including digital RF receiving means for receiving digitally encoded RF signals transmitted by mobile/portable RF transceivers over a slotted inbound RF channel, and means for decoding said digitally encoded RF signals received by said digital RF receiving means to provide corresponding digital messages and for communicating said digital messages to a digital voter apparatus, said digital messages being organized into frames, said digital voter apparatus comprising:
 receiving means operatively connected to each of said means for decoding for receiving and temporarily storing a frame of said digital messages communicated thereto from each of said plural sites;
 error rate computing means for calculating an indication of the reliability of said stored frames of digital messages; and
 selecting means operatively connected to said error rate computing means for selecting and outputting a message frame received by said receiving means having the lowest calculated error indication associated therewith and for discarding all other stored message frames; and
 wherein each of said frames comprise a certain number of bits;
 said error rate computing means calculates said reliability indication based on less than said certain number of bits; and
 said selecting means selects said messages on a frame-by-frame basis.

9. In a digitally trunked RF communications system which assigns RF channels for temporary use by RF transceivers, said system being capable of communicating digital signals transmitted by said RF transceivers, a digital voter for selecting between different versions of said digital signals, said voter comprising:
 a digital signal bus;
 reliability determining means for determining an indication of reliability of a version of said digital signals; and
 delay means, coupled to said bus and to said reliability determining means, for delaying application of said version of said digital signals to said bus by a duration responsive to said determined reliability indication.

10. An RF communication system digital signal voter comprising:
 reliability indicator determining means for determining an indication of the reliability of a frame of digital signals; said frame including a certain number of bits, and said reliability determining means including error rate computing means for calculating said reliability indication based on less than said certain number of bits of said frame; and
 selecting means for selecting said frame of digital signals in response to said reliability indicator determination;
 wherein said digital signal voter votes on said digital signals on a frame-by-frame basis.

11. A voter as in claim 10 wherein said reliability indication includes bit error rate.

12. In a trunked RF communication system, a method of voting on digital signals received over an RF channel comprising the following steps:
   (a) calculating bit error rate for each of a plurality of redundant digital signal frames; and
   (b) scheduling application of each of said redundant digital signal frames to a common digital signal bus at times responsive to the bit error rates calculated for said frames.

13. A method as in claim 12 further including the steps of:
   (c) detecting whether there is activity on said bus; and
   (d) inhibiting application of at least one frame of digital signals to said bus in response to detected bus activity.

14. In a trunked RF communication system of the type capable of communicating digital signals, a method of voting on digital signals received over an RF channel on a frame-by-frame basis, said method comprising:
   calculating the bit error rate of a frame of digital signals; and
   applying said frame of digital signals to a voter bus beginning at a time responsive to said calculated bit error rate.

* * * * *